(12) United States Patent
Yuen et al.

(10) Patent No.: US 8,825,534 B2
(45) Date of Patent: Sep. 2, 2014

(54) SYSTEM, METHOD, AND COMPUTER PROGRAM FOR MANUFACTURING ESTIMATION PRODUCTION ASSEMBLY AND INVENTORY MANAGEMENT

(75) Inventors: Jason Yuen, Toronto (CA); Sean Kirby, Toronto (CA); Kevin Wong, Toronto (CA); Jason Tham, Toronto (CA); James Michiya Ho, Toronto (CA); Bryce Kwan, Ajax (CA); Alfred Kuo Hui Wong, Toronto (CA); Ian Bailey, Toronto (CA); Shehzad Zaver, Toronto (CA)

(73) Assignee: Nulogy Corporation, Toronto (CA)

( * ) Notice: Subject to any disclaimer, the term of this patent is extended or adjusted under 35 U.S.C. 154(b) by 0 days.

(21) Appl. No.: 13/131,410

(22) PCT Filed: Mar. 9, 2009

(86) PCT No.: PCT/CA2009/000281
§ 371 (c)(1),
(2), (4) Date: May 26, 2011

(87) PCT Pub. No.: WO2010/060181
PCT Pub. Date: Jun. 3, 2010

(65) Prior Publication Data
US 2011/0251865 A1 Oct. 13, 2011

Related U.S. Application Data
(60) Provisional application No. 61/118,567, filed on Nov. 28, 2008.

(51) Int. Cl.
G06Q 10/00 (2012.01)

(52) U.S. Cl.
USPC ............ 705/28; 705/1.1; 705/22; 705/26.5; 705/29; 705/301

(58) Field of Classification Search
None
See application file for complete search history.

(56) References Cited

U.S. PATENT DOCUMENTS

| | | | | |
|---|---|---|---|---|
| 5,946,662 | A | * | 8/1999 | Ettl et al. ................... 705/7.26 |
| 6,339,764 | B1 | | 1/2002 | Livesay et al. |
| 8,266,066 | B1 | * | 9/2012 | Wezter et al. ................. 705/78 |

(Continued)

FOREIGN PATENT DOCUMENTS

| | | |
|---|---|---|
| CA | 2251075 C | 8/1997 |
| EP | 1770613 A1 | 4/2007 |
| WO | 2007127226 A2 | 8/2007 |

OTHER PUBLICATIONS

Related PCT International Application No. PCT/CA2011/001389 Search Report dated Jan. 31, 2012.

(Continued)

Primary Examiner — Fateh Obaid
(74) Attorney, Agent, or Firm — Perry + Currier Inc.; Kristjan Spence

(57) ABSTRACT

The present invention relates to novel systems and methods for manufacturing estimation, production assembly and inventory management. In an embodiment, a system is provided to create and respond to RFPs, perform capacity planning for an eventual production line, efficiently implement the production line in software, and track detailed warehouse data, including transaction data. Such tracking may allow process improvement, report generation, and market research analysis. In an embodiment, one or more systems may be used to implement one or more aspects of the present invention.

17 Claims, 22 Drawing Sheets

(56) References Cited

U.S. PATENT DOCUMENTS

| | | | |
|---|---|---|---|
| 2002/0059108 A1* | 5/2002 | Okura et al. | 705/26 |
| 2003/0014142 A1 | 1/2003 | Olle et al. | |
| 2003/0074284 A1 | 4/2003 | Bowden | |
| 2003/0195824 A1* | 10/2003 | Duffy et al. | 705/26 |
| 2003/0212610 A1 | 11/2003 | Duffy et al. | |
| 2006/0149658 A1 | 7/2006 | Smith | |
| 2006/0229899 A1 | 10/2006 | Hyder et al. | |
| 2010/0146047 A1* | 6/2010 | Grieder et al. | 709/204 |
| 2011/0251865 A1 | 10/2011 | Yuen et al. | |

OTHER PUBLICATIONS

Related PCT International Application No. PCT/CA2011/001389 Written Opinion dated Jan. 31, 2012.

Corresponding Chinese Patent Application No. 200980155396.4 office action of Nov. 29, 2013.

Barco et al: "SmartStock.WMS Warehouse Management System", Aug. 5, 2008. XP055102765. Retrieved from the Internet: URL:http://www.smartstock.biz/download [retrieved on Feb. 2, 2014].

Sage Software: "Cost Justifying Warehouse Management Technologies in Small and Midsized Warehouses" Aug. 1, 2006. XP055102777. Retrieved from the Internet: URL:http://www.axisgp.com/pdf/WMS/WMS%20Cost%20Justification%20Whitepaper.pdf [retrieved on Feb. 18, 2014].

Corresponding European patent application No. 09828472.2 dated Feb. 26, 2014.

* cited by examiner

| Scenarios | | | | + Add Scenarios |
|---|---|---|---|---|

Scenario: 50000 Units    ☐ Import  ⧉ Duplicate  ✖ Delete

Scenario description: 50,000 chocolate boxes    Create Project Using This Scenario →     Item description: Finished Good White Chocolate Box    ✎ Edit Scenario Status: Unspecified    Item: FGWhiteChoco Volume: 0.0 Eaches    Item category: No item category Production time: 0.0 Hours    Item type: No item type Total charges: 0.00000    Chargeable unit: Eaches Units per shift: 0.0000

| Effective Pricing | | | | | 🗎 Pricing Schedule |
|---|---|---|---|---|---|
| Charge Item | Cost per Unit | Markup | Markup per Unit | Charge per Unit | |
| Labor | 0.00000 | 0.00% | 0.00000 | 0.00000 | ✎ |
| Materials | 0.00000 | 0.00% | 0.00000 | 0.00000 | ✎ |
| Overhead | 0.00000 | 0.00% | 0.00000 | 0.00000 | ✎ |
| Setup | 0.00000 | 0.00% | 0.00000 | 0.00000 | |
| Machine | 0.00000 | 0.00% | 0.00000 | 0.00000 | |
| Totals | 0.00000 | | | 0.00000 | |

FIG. 11B

ABC: Assembly Details                                                                                    Back to Estimate

Production Details                                                                              ☐ Update scenario Standard production: 0.00 units per hour          0.00000 person hours per unit
                    0.00000 units per minute      0.00 person minutes per unit
          People: 0.00
      Efficiency: 100.00%
Expected production: 0.00 units per hour                                      ✎ Edit Production Details
     Labor charge: 0.00 per person hour        1106c    1106d
                                                                      ⎫
                                                                      ⎬ 1106i
                                                                      ⎭

Wage Details

| Badge type | Rate | Quantity |
|---|---|---|
| Global Manufacturing - Full Time ▾ | | ☐ |
| No Items | | |
| Average/Total | 0.00000 | 0.00000 |

➕

Assembly Steps                                                                    ⊙ Optimize

| Name | Description | People | Time (s) | Reps/Unit | Suggested People |
|---|---|---|---|---|---|
| ☐ | ☐ | ☐ | ☐ | ☐ | ☐ |
| No Items. | | | | | |
| | | | | | 0.00 |

ABC: Subcomponents for Estimate #1978 - Scenario: 50000 Units

Back to Estimate

Bill of Materials  📄 Import ☐ Update scenerio

| Code | Description | Cost/Unit | Markup/Unit | Markup % | Charge/Unit | Qty | Unit of Measure |
|------|-------------|-----------|-------------|----------|-------------|-----|-----------------|
|      |             |           |             |          |             |     | Eaches ▾  ✚    |

No Items.

1108c

PackManager ©2008 Nulogy Corporation

Item #6294 - 8140-F01629 ✏️

| Item Information | |
|---|---|

Import from another item [Select ▼] ☐         ✏️ Edit Item Information

1104 {
- Description: ACME SNACKS 24 CT BTS KO FAMILY SACK 043970-03
- Alternate code 1: 043970-03
- Alternate code 2:
- Type: No Item type
- Category: No Item Category
- Customer: ACME SNACKS
- Inactive: No
- Track pallets: Yes
- Quick consume: No
- Track lot code by: pallet
- Track lot code: Yes
- Track expiry date: No

- Unit of measure: Eaches
- Eaches per case: 4.0
- Cases per full pallet: 42.0
- Material cost per unit: 0.60466
- Weight per pallet: 0.0 lbs 1108c

| Bill of Materials | | | | ⓐ Update Cost From Bill of Materials |
|---|---|---|---|---|
| Subcomponent | Description | Quantity | Unit of measure | Cost |
| 8140-C00285 - OR CEDAR 16" CEDAR PLANKS UN-BRANCED ▼ | | [    ] | | ➕ |
| 8140-R00827 | ACME SNACKS 43970-03 CASE LABEL FOR 24 CT BTS KO | 0.25000 | Eaches | 0.00502 ✏️✗↓ |
| 8140-R00826 | ACME SNACKS 992495 BTS SACK KNOCK OUT CARTON | 0.25000 | Eaches | 1.77473 ✏️✗↑↓ |

ABC: Project #6439 - ACME SNACKS -8140-F01629-0.0 ✏

Project Information

| | | |
|---|---|---|
| Customer: | ACME SNACKS | ✏ Edit Project Information |
| Scenario: | 24 CT BTS KO FAM SACK - Estimate 1711 - item 8140-F01629 | |
| Item: | 8140-F01629 | |
| Eaches Expected: | 0.00 | |
| Eaches Unscheduled: | 0.00 | |
| Eaches Remaining: | 0.00 | |
| Reference 1: | | |
| Reference 2: | | |
| Due Date: | | |
| Closed: | No | |
| Last Job Completed: | | |
| Description: | | |

⎫
⎬ 1104
⎭

Jobs
⎯⎯⎯⎯⎯⎯⎯⎯ 1104 ⎯⎯⎯⎯⎯⎯⎯⎯

| ID | Expected Start | Expected End | Actual Start | Actual End | Line | Line Leader | Expected Eaches | Actual Eaches |
|---|---|---|---|---|---|---|---|---|
| | [2008-Oct-21 10:55 ▼] | [2008-Oct-21 10:55 ▼] | | | [ADVENT CA ▼] | [ ▼] | [ ] | ➕ |

No items.

| Time Tracking | | | | ⊙ Update Time Records |
|---|---|---|---|---|

Expected People  Actual People  Actual Person Hours
20.0            0              0.00
[      ]        ✚ Scan badge ⓐ Hide manual entry Add [ 0] [Global Manufacturing ▼] personnel from [2008-Oct-21 11:28AM 📅] to [            📅] ✚

ⓐ Hide time reports

| ☐ Badge Code | Type | Clock In | Clock Out | Duration |
|---|---|---|---|---|

No items.

[    ] [    ] [    ] [    ] [    ] [    ]  📄✖

ⓐ Hide time reports

ⓐ Hide breaks

| Type | Start | Stop | Duration | |
|---|---|---|---|---|
| ☐ | [2008-Oct-21 11:31AM] | [2008-Oct-21 11:31AM] | | ✚ |

No items.

ⓐ Hide breaks 1104 (bracket on left spanning time reports section)

| Production Tracking | | | | | Update Production Records | Return items to Storage |
|---|---|---|---|---|---|---|
| Total Eaches to Produce | | | Eaches per Hour (See Person Hours per Eaches...) | | | Performance |
| Expected | Actual | Complete | Standard | Expected | Actual | Efficiency |
| 3600.00 | 0.00 | 0.00% | 1920.00 | 0.00 | 0.00 | 0.00% |

Add Production — Update lots & expires from WP — Print pallet tags

| | Lot Code | Expiry date |
|---|---|---|
| | 8140-F01628 | |
| | 8140-C06800 | |
| | 8140-C06801 | |
| | 8140-C06802 | |
| | 8140-C06811 | |
| | 8140-C06812 | |
| | 8140-C06915 | |

Produce: [ ] [Eaches ▾] on [new pallets ▾] ✚ Add

⊖ Hide production records

| ☐ Pallet Number | Eaches | Produced At | Lot Code | Expiry Date |
|---|---|---|---|---|
| No items | | | | |

⊖ Hide production records

FIG. 12D

| Rejects | | | | |
|---|---|---|---|---|
| Item: | Quantity: | Units: | | |
| Select an item ▾ | | Eaches ▾ | + Add reject | |
| ⓐ Hide rejects | | | | |
| Item | Lot Code | Expiry Date | Quantity | |
| No items | | | | |
| ⓐ Hide rejects | | | | |

1104 braces the table above; 1102 points to it.

SYSTEM, METHOD, AND COMPUTER PROGRAM FOR MANUFACTURING ESTIMATION PRODUCTION ASSEMBLY AND INVENTORY MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Brand-owner companies (customers) such as large consumer-packaged goods companies continue to increasingly outsource portions of their logistics and manufacturing activities to specialized contractors that are able to lower costs and add value to the supply-chain of the brand-owners.

These brand-owner customers often use various contractors to provide these contract services as contractors with aptitude or abilities in one service often lack aptitude in one or more others. For example, contractors who handle logistics or capacity planning lack aptitude with respect to manufacturing aspects of the customer's outsourced business. Handling both services increases business complexity for the contractor. This may be, for example, because they are at the end of the brand-owner's supply chain and have little control or influence over the lead times, and delivery dates of the products they must manufacture with, and deliver.

Challenges of this business are further heightened because of the nature of modern consumer markets and brand-owner sales strategies. The result are services, such as manufacturing projects that may be highly variable, may have very short production run durations (sometimes just a few hours), and may be so complex that they require extensive manual labor. These contractors may need to meet all these requirements and pressures while maintaining high throughput, and meeting rigorous quality and compliance standards.

There thus remains a need for systems and methods that help handle these and other challenges for customers, and the contractors that serve them, with lower cost, less time, greater accuracy, and higher levels of quality.

SUMMARY OF THE INVENTION

In one aspect of the present invention, a system for request for proposal (RFP) processing is provided, the system comprising: a system provider, the system provider including (i) a customer module configured to create a RFP and provide it to one or more assemblers, and (ii) an assembler module configured to create a request for proposal response (RFPR) and provide it to a customer.

In another aspect of the present invention, a method for enabling a customer to create a request for proposal (RFP) and enabling a contractor to respond to the RFP with a RFP response (RFPR) is provided, the method comprising: facilitating preparation of a RFP by a customer; enabling the customer to submit the RFP; disseminating the RFP to one or more contractors; facilitating creation of a RFPR by each contractor; enabling each contractor to finalize the RFPR; and providing the one or more RFPRs to the customer.

In a further aspect of the present invention, a warehouse system for obtaining transaction data relating to one or more finished goods is provided, the warehouse system comprising: a receiving terminal configured to capture transaction data related to receiving of at least one component good, each component good including one or more sub-components; at least one warehouse terminal configured to capture transaction data related to storing or moving of at least one component good; a shipping terminal configured to capture transaction data related to shipping one or more finished goods or one or more sub-components; wherein at least one of the receiving terminal, the at least one warehouse terminal and the shipping terminal are configured to be in communication with a system provider that is configured to obtain and maintain transaction data.

In a still further aspect of the present invention, a method for clean transaction data relating to one or more finished goods is provided, the method comprising: receiving at least one component good, each component good including one or more sub-components; capturing transaction data related to the receiving of each component good; storing each component good; capturing transaction data related to the storing of each component good; shipping one or more finished goods or one or more sub-components; capturing transaction data related to the shipping of each finished good or each sub-component; and obtaining and maintaining the transaction data.

In yet another aspect of the present invention, a system for inventory management and capacity planning is provided, the system comprising: a system provider configured to receive one or more assembler inputs and one or more customer inputs, further comprising an inventory management module for capturing inventory data, a production module for performing capacity planning and managing production and data stores for storing inventory data.

In one aspect of the present invention there is a system for inventory management and capacity planning comprising system provider further comprising an inventory management module for inventory management, a production module for performing capacity planning and managing production and data stores for storing transaction data or inventory data. The inventory management module may receive transaction data from a warehouse system, as described herein, allowing inventory management. Such transaction data may comprise inventory data and may be user inputs or machine inputs. User inputs may include data entered into a terminal such as in a warehouse and machine inputs may include data obtained from machines in a warehouse, such as in WIP.

The inventory management module may allow monitoring inventory in real-time. This may be accomplished using transaction data or inventory data. The production module may be configured to create one or more production lines. This may be via receiving user inputs, using one or more templates for production lines, or using data from customer requests and contractor responses.

The production module may be configured to receive one or more requirements and one or more resource inputs to create one or more scenarios for the one or more production lines. The production module may be configured to determine whether, for at least one of the one or more scenarios, at least one of the one or more requirements for the production line can be met based on at least one of the one or more resource inputs. This may occur in real-time.

The production module may be configured to allow monitoring of the production line and making changes, or requesting changes, thereto.

The system may further comprise a contractor response module for creating a customer response or a customer request module for creating a customer request. The contractor response module may provide data from the contractor response or the customer request module may provide data from the customer request, to the production module for creating the production line.

Such a system may be configured to operate as a Software as a Service (SaaS).

In another aspect of the present invention there may be a warehouse system for obtaining transaction data relating to one or more finished goods comprising one or more sub-components. The warehouse system may comprise a receiving terminal configured to capture transaction data related to receiving of at least one component good, at least one warehouse terminal configured to capture transaction data related to storing or moving of at least one component good, and a shipping terminal configured to capture transaction data related to shipping one or more finished goods or one or more sub-components, wherein at least one of the receiving terminal, the at least one warehouse terminal and the shipping terminal are configured to be in communication with a system provider that is configured to obtain and maintain transaction data.

System provider may be configured to enable one or more monitoring terminals or computing devices to view at least a subset of the transaction data. This may be via monitoring module providing data to the terminal, such as over a communication network.

The system may further comprise a work-in-progress (WIP) terminal configured to capture transaction data from WIP. The system may further comprise one or more machine terminals configured to capture transaction data related to moving sub-components.

The system may be integrated with a warehouse system by enabling at least one of the receiving terminal, the at least one warehouse terminal, the shipping terminal and the WIP terminal, to communicate with the system over at least one communication network. The warehouse system may communicate with the inventory management module.

In another aspect of the present invention there is a system for customer request processing comprising a system provider 18 which may have a customer module 22c configured to create a customer request and provide it to one or more contractors 12, and an contractor module 22a configured to create a contractor response and provide it to a customer 14. Communication between one or more contractors 12 and customers 14 may be over one or more communication networks, such as the Internet. The system for customer request processing may be offered may be offered in a software as a service (SaaS) model or architecture. When a customer request is completed, it may be provided automatically, to one or more contractors 12. System 10 may determine which contractors 12 to provide it to. Similarly when a contractor response is completed, it may be provided automatically to customer 14.

System, and customer module and/or contractor module may have one or more templates to facilitate creation of customer requests and contractor responses. These templates may be selected by a user or suggested by system, for example, based on the user having created the template, having previously used the template, or having created a customer request or contractor response for a similar service. Templates may include pre-set values for any of the data that may make up customer requests and contractor responses, as described herein.

System may further allow a contractor to import one or more aspects of their contractor response into an actual production line or production environment.

Embodiments of this invention are further discussed herein below.

BRIEF DESCRIPTION OF THE DRAWINGS

The invention is illustrated in the figures of the accompanying drawings which are meant to be exemplary and not limiting, in which like references are intended to refer to like or corresponding parts, and in which:

FIGS. 11A-E are embodiments of user screens for a RFPR according to the invention;

FIGS. 12A-E are embodiments of user screens for a project or production line according to the invention;

FIG. 14 is an embodiment of a user screen for capacity planning according to the invention.

DETAILED DESCRIPTION OF THE INVENTION

Figure 1:
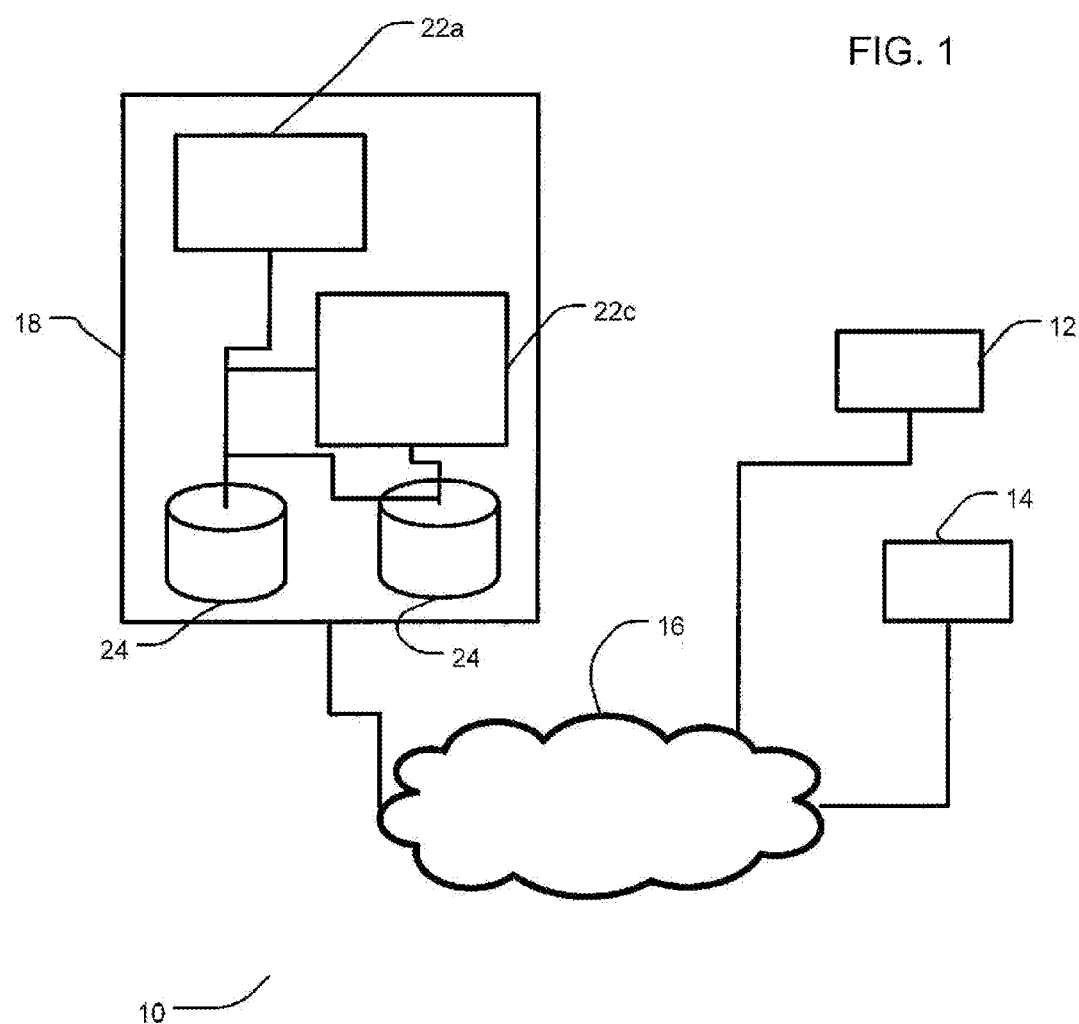
FIG. 1 is a diagram of an embodiment of a system according to the invention.

Definitions:

As used throughout this specification, the following terms will have the following meanings:

Computing device: An electronic hardware component that may be able to communicate with other computing devices. A computing device may include, but is not limited to personal computers (PC), server computers, laptop computers, Personal Digital Assistants (PDA), computer terminals, Programmable Logic Controllers (PLC), cellular telephones, production line devices, assembly machines, and devices mounted on warehouse machines. Computing devices may further comprise one or more peripheral devices such as scanners, printers, bar-code readers, Bluetooth or other receivers, or imaging devices.

Customer request: An invitation for service providers, contractors, suppliers or assemblers, often through a bidding process, to submit a proposal on specific commodities, finished goods, or services. A customer request may include one or more of: a list of specific sub-components to be used, quantities of finished goods required, timelines for completion, number of people required for the production line, product specification information and other details. A customer request may be contained, entered into and viewed in one or more user screens of data. A customer request may include one or more 'scenarios' that have different requirements—different volumes of finished goods, different timelines etc. A customer request may further include packaging specification information, that may provide more detailed information about a proposal or may substantially be an entire customer request—such as if a bidding process is not required in awarding a contract to assemble. An exemplary customer request may be a RFP and such terms are used interchangeably throughout, unless noted otherwise.

Request for Quote (RFQ): An invitation for contractors (which include suppliers or assemblers) to a bidding process to bid on specific commodities or services. RFQs often include the specifications of the items/services to make sure all the suppliers are bidding on the same item/service. As used herein, RFQs will be considered substantially similar to customer requests unless specifically noted otherwise.

Contractor response, Request for Proposal Response (RFPR), estimate or quote (terms to be used interchangeably unless otherwise noted): A response to a RFP by a contractor (which include suppliers or assemblers). A RFPR may include: a list of specific sub-components to be used, quantities of finished goods required, timelines for completion, product specification information, number of people required for the production line, and other details. An RFPR may include factors that may be determinative of whether the RFPR is selected by the customer such as price. Pricing information may be included in a pricing schedule. Each RFPR may include one or more 'what-if scenarios' or 'scenarios' that are geared to achieve one or more requirements of one or more scenarios in the RFP that the RFPR is responding to. Each scenario may have its own RFPR data. A customer can select a particular 'scenario' of the RFPR to put into production. A RFPR may be contained, entered into and viewed in one or more user screens of data.

Pricing schedule: A compilation of the various costs related to a scenario. Pricing schedules can be saved with RFPs and/or RFPRs in libraries and re-used to increase efficiency. Pricing schedules may include pricing information relating to one or more of labor information, commodity costs, sub-component costs, manufacturing costs, and transportation costs (shipping and receiving for example), overhead costs, space costs, or commission costs. Details in pricing schedules can be entered manually by assemblers preparing the RFPR or can be linked to data sources (such as third party websites or news tickers) to acquire relevant costs (such as prime rate, minimum wage, commodity prices). Pricing schedules may include point-in-time pricing information or may show how any of these costs may change over time or have changed over time. Additionally, pricing schedules may track the total amount of one or more costs (such as labor or electricity) of an entire job or project and/or may allocate such costs on a "per finished good" basis. One or more pricing schedules may also allow creation of "cost plus" RFPRs—where a fixed markup or margin is applied over actual labor, materials, sub-component prices, overhead, etc. This margin may be applied to individual items in a pricing schedule, or to one or more pricing schedules.

Request for Quote Response (RFQR): A response to a RFQ by a supplier or assembler. As used herein, RFQRs will be considered substantially similar to RFPRs or contractors responses unless specifically noted otherwise.

Software as a Service (SaaS): A model of software deployment where an application is hosted as a service provided to customers across a network such as the Internet. The application may be installed and run on a computer that may be part of, or separate from, the customer's or contrator's own computer systems. Service Providers may host the application on its own web server, or this function may be handled by a third-party application service provider (ASP).

Overview:

Aspects of the Invention

The present invention, in one aspect thereof, provides a framework for expediting and improving the quality of contractor responses to customer requests. The framework may include a customer module that enables the customer to create a customer request and provide the request to an assembler module. The assembler module may enable a contractor to create a response to the customer request by leveraging the customer request, and then submit to the customer module the contractor's response. The customer can thereby easily disseminate a customer request to a one or more assembler modules corresponding to a one or more contractors, and receive back competing responses from the one or more contractors.

The present invention, in another aspect thereof, provides a system for real-time, transactional data tracking that provides greater visibility and traceability of product handling. This may include providing real-time inventory, labor, and production visibility or monitoring all the way into, and through, a production line. Such real-time and/or transaction data may enable more flexible and responsive capacity planning, such as for automatically determining subcomponents that may need to be ordered because production is running ahead of schedule. The transaction data may be obtained and stored by a system provider throughout the production line including at a receiving terminal, at least one warehouse terminal, and/or a shipping terminal. The system provider may maintain the transaction data to enable a customer or contractor to have real-time inventory, labor, and production visibility or monitoring of goods and components and sub-components thereof.

The present invention, in yet another aspect thereof, is operable to process the transaction data gathered by the present invention to provide automated and configurable capacity planning and inventory management.

In another aspect there may be provided one or more approaches to system architecture which may allow for reporting and business intelligence that can support continuous improvement activities. This may involve storing real-time metrics and data (such as relating to a production line) and being able to associate and report on them relative to initial estimates or targets (such as may have been provided or designed in a contractor response).

In another aspect of the present invention, the assembler module referred to above can gather historical data based on a contractor's previous responses enabling a contractor to return to previously provided contractor responses and simulate productions using "what-if" data to see what might have improved the service that the contractor would have or did provide.

There may further be a manner of servicing the collaborative and collaboration needs of both the customer and contractor in an integrated system. This may allow data from customer requests and contractor responses to be imported directly into the operational or production systems. This may be more efficient and may ensure higher quality production, and may allow data from the production operational system to be available to the customer to enable more informed decision-making about production, the contractor response, or their own customer request.

The collection of one or more data points (such as transaction data, labor data, etc, from both the customer and contractor) and the present systems may enable data mining relating to either parties' business. Such data mining may provide information valuable to the customers, contractors, or one or more industries as a whole.

In another aspect of the present invention there is a system for inventory management and capacity planning comprising system provider 18 further comprising an inventory management module for inventory management, a production module for performing capacity planning and managing production and data stores for storing transaction data or inventory data. The inventory management module may receive transaction data from a warehouse system, as described herein, allowing inventory management. Such transaction data may comprise inventory data and may be user inputs or machine inputs. User inputs may include data entered into a terminal such as in a warehouse and machine inputs may include data obtained from machines in a warehouse, such as in WIP.

The inventory management module may allow monitoring inventory in real-time. This may be accomplished using transaction data or inventory data.

The production module may be configured to create one or more production lines. This may be via receiving user inputs, using one or more templates for production lines, or using data from customer requests and contractor responses.

The production module may be configured to receive one or more requirements and one or more resource inputs to create one or more scenarios for the one or more production lines. The production module may be configured to determine whether, for at least one of the one or more scenarios, at least one of the one or more requirements for the production line can be met based on at least one of the one or more resource inputs. This may occur in real-time.

The production module may be configured to allow monitoring of the production line and making changes, or requesting changes, thereto. This may allow a customer to request a change, such as to add a machine, to increase the output. Alternatively, a contractor (who may control the production line) may directly make changes to the production line.

The system may further comprise a contractor response module for creating a contractor response and/or a customer request module for creating a customer request. The contractor response module may provide data from the contractor response or the customer request module may provide data from the customer request, to the production module for creating the production line.

Such a system may be configured to operate as a Software as a Service (SaaS).

In another aspect of the present invention there may be a warehouse system 800 for obtaining transaction data relating to one or more finished goods comprising one or more sub-components. System 800 may comprise a receiving terminal configured to capture transaction data related to receiving of at least one component good, at least one warehouse terminal configured to capture transaction data related to storing or moving of at least one component good, and a shipping terminal configured to capture transaction data related to shipping one or more finished goods or one or more sub-components, wherein at least one of the receiving terminal, the at least one warehouse terminal and the shipping terminal are configured to be in communication with a system provider that is configured to obtain and maintain transaction data.

System provider 18 may be configured to enable one or more monitoring terminals or computing devices to view at least a subset of the transaction data. This may be via monitoring module 52 providing data to the terminal, such as over a communication network, for example as one or more web pages (which may be XML pages) that may contain links that allow viewing one or more other subsets of transaction data. This may allow, for example, a user to view more detailed information about one or more aspects of inventory 808 in the warehouse, or performance of a machine in the warehouse.

System 800 may further comprise a work-in-progress (WIP) terminal configured to capture transaction data related to using one or more sub-components to assemble one or more finished goods or labor information (such as employees' time) in WIP or relating to a production line. System 800 may further comprise one or more machine terminals configured to capture transaction data related to moving sub-components. An exemplary machine terminal may be a forklift with a terminal or barcode reader that can be used, such as by a forklift operator, to enter (capture) transaction data as inventory 808 is moved within the warehouse.

System 800 may be integrated with system 10, as described herein, for example by enabling at least one of the receiving terminal, the at least one warehouse terminal, the shipping terminal and the WIP terminal, to communicate with system 10, for example inventory management module, over at least one communication network. The warehouse may have a local area network to which all terminals that collect transaction data are connected. One terminal in the local area network may then be connected, for example over the Internet, to system 10, to allow transaction data to be stored, for example in data stores 24.

In yet another aspect of the present invention there is a system for customer request processing comprising a system provider 18 which may have a customer module 22c configured to create a customer request and provide it to one or more contractors 12, and an contractor module 22a configured to create a contractor response and provide it to a customer 14. Communication between one or more contractors 12 and customers 14 may be over one or more communication networks, such as the Internet. The system for customer request processing may be offered in a software as a service (SaaS) model or architecture. When a customer request is completed, it may be provided automatically, such as in real-time via electronic transmission for example, to one or more contractors 12. System 10 may determine which contractors 12 to provide it to, based on, for example, services that system 10 knows contractor 12 can perform, or is judged to perform well. Similarly when a contractor response is completed, it may be provided automatically, such as in real-time via electronic transmission for example, to customer 14.

System 10, and customer module 22c and/or contractor module 22a may have one or more templates to facilitate creation of customer requests and contractor responses. These templates may be selected by a user (such as customer 14 or contractor 12) or suggested by system 10, for example, based on the user having created the template, having previously used the template, or having created a customer request or contractor response for a similar service. Templates may include pre-set values for any of the data that may make up customer requests and contractor responses, as described herein.

In another aspect of the present invention, system 10 may further enable a contractor 12 to import one or more aspects of their contractor response into an actual production line or production environment. This may facilitate, and make more efficient, providing the service (such as assembling finished goods via a production line) by obviating the need to manually re-enter data that has already been captured in customer requests and contractor responses.

Combination of Aspects of the Invention

The system for inventory management and capacity planning may operate with warehouse system 800 to provide transaction data. This may provide additional benefits for the system for inventory management and capacity planning, as described herein.

In addition, system 10 may be used to establish a relationship between customers 14 and contractors 12, leading to the exchange of customer requests and contractor responses. Customer requests and contractor responses, and system 10 in general, may be used with, or be part of the system for inventory management and capacity planning and may allow, for example, a production line to be easily created by a production module from data in customer requests and contractor responses.

Interactions Between Customers and Contractors

The present invention, in one aspect thereof, provides a framework for enabling a customer to create a RFP and provide the RFP to one or more contractors. The one or more contractors may then create a RFPR by leveraging the RFP. The contractors may then submit the RFPR to the customer. The framework is more specifically described below.

Customers 14 have various services they need done (such as assembly of finished goods from one or more sub-components) that may fall outside of their capability or core competence. In such cases, customers 14 may engage service providers, such as contractor 12 to perform the service.

Through provision of a RFP, customer 14 may provide some details about the service they need performed. Such RFP may include, to varying degrees, details about the relationship of the parties, details about the finished services and/or goods and sub-components, production amounts and timelines, and details about how the service is to be performed.

In providing a RFP response, service provider or contractor 12 may provide or confirm details provided in the RFP and may include specific information about how they propose performing the service, or assembly. The RFP response may also allow the service provider to design a production line (for example a virtual estimation production line) using one or more software modules of system provider 18 and ensure that such production line can meet the requirements as set out in the RFP.

Aspects of the present invention enable RFPs and RFP responses to be created and distributed.

User screens 300 may facilitate preparation of a RFP by a customer by providing to a customer intelligent searching for previously used elements (such as sourcing of sub-components, design of production lines or virtual production lines, and required resources) and suggestion of approaches for a given finished good the present invention may make creation much faster. For example when a customer is preparing a RFP for a gift basket and they have previously done an RFP for gift baskets a template to start from may be provided by system provider 18.

Once the customer has finished preparing the RFP, the customer may then submit the RFP and designate one or more contractors to receive the RFP. System provider 18, and data in data stores 24 may be used to automatically distribute a RFP to appropriate contractors 12 immediately when customer 14 has submitted the RFP. Customer 14 may have a list of contractors 12 for a particular type of finished good, or system provider 18 may identify what core competencies are required of contractor 12 and send the RFP immediately to those contractors 12. Similar user screens and aspects of system provider 18 may operate in creating and finalizing a RFP response from contractor 12 and then providing the RFP response to the customer 14.

Customer 14 may select a RFP response (and its associated contractor 12) to perform the job (such contractor 12 having then won the contract to, for example, assemble the finished good). At such point, contractor 12 may be notified and be required to implement a production line, for example in one or more warehouses or assembly spaces.

Aspects of the present invention enable contractor 12, having won the contract, to quickly and efficiently set up a production line.

The estimation production line may be converted directly into a production line that can be used in capacity planning and warehouse management aspects of the present invention (which may be referred to as WIP 816). This prevents contractor 12 from having to manually enter or re-design a production line. Substantially any details from the RFP or RFP response can be directly imported into the production line. This may allow, for example, a salesperson to create the estimation production line which an engineer directly imports into the production environment. Although changes may be made, such direct importing may save time and allow for comparisons to later be made between the estimation production line (in, for example, the RFP response) and the production line.

At the same time as contractor 12 is required to implement a production line, they may be required to monitor the production line, for example to ensure that requirements are met (such as volumes, timelines, costs etc).

Aspects of the present invention enable contractor 12 and customer 14 to perform capacity planning, monitor and adjust production, and adjust requirements, in real-time. Various modules of system provider 18, such as monitoring module 52 and production module 120 may provide this functionality to be carried out by one or more terminals used by customer 14 or contractor 12. Various modules of system provider 18 may show the exact state of production (such as in real-time), what resources or sub-components may run out, and any other impediments to meeting requirements. Customers 14 or contractors 12 may, via one or more terminals configured to communicate with system provider 18, alter the production line or place orders for sub-components etc to continue to meet requirements, or may alter requirements. These tasks may be done in real time and may be possible because transaction data is kept (which may provide a real-time view of all aspects of production). Capacity planning, warehouse management, and monitoring functionality may all be directly linked and may be leveraged to improve one or more aspects of performance of the service, customer satisfaction, and efficiency.

An aspect of the present invention that may allow system provider 18 to accurately show and maintain the exact state of production may be warehouse system 800. System 800 may comprise one or more terminals, including a receiving terminal, one or more warehouse terminals, and a shipping terminal, that collect transaction data relating to the warehouse and production line (WIP). Such transaction data may relate to, for example, arrivals of components or sub-components, movements of components or sub-components, performance of machines on the production line, finished goods moved to shipping, and waste. Such transaction data may be provided to, and stored by, system provider 18 and may be used in capacity planning, production, and monitoring. Transaction data relating to recalled sub-components or finished goods, wasted inventory 808, or other deviations towards successful finished goods may also be collected and maintained. Such transaction data may increase the efficiency of recalls because specific sub-components that are being recalled may be located in real-time.

Having completed at least a portion of a service (such as production of one or more jobs of finished goods), service provider and customer 14 may want to perform various reporting or analysis of the service. Such analysis may be to compare the RFP response to production, efficiencies in providing the service or assembling the finished goods (such as waste, inefficient movement of sub-components in becoming finished goods, etc).

Aspects of the present invention allow customers 14 and service providers to perform detailed analysis. Estimation production lines (and related estimates such as financial, waste amounts, labor costs etc) may be compared to production lines that were implemented. This may be because both were stored at system provider 18 and may be because estimation production lines were directly imported to be production lines. Further, linking capacity planning to warehouse management allows identification of reasons for gaps between planning to meet requirements and actually meeting them. Additionally, if warehouse management is by system 800 or collects and stores transaction data, re-creation of any aspect of the service is possible, at any point in time. Transaction data allows 're-winding' and 're-playing' of the production to see what happened.

The advantages described in this overview may be some of the advantages provided by some aspects or embodiments of the present invention. It is to be understood that not all aspects or embodiments may provide any one or more of these particular advantages. It is further to be understood that specific embodiments and examples, as described herein, are meant to be exemplary only and not limit the scope of the present invention as described herein.

The remainder of the present application is now generally divided into sections that describe aspects of the present invention. Such sections are generally evidenced by headings. Different aspects of the present invention may be described or discussed in one or more sections (for example as different aspects interact in different ways). Headings are intended to facilitate reading and comprehension of aspects of the present invention.

Architectural System

FIG. 1 is a diagram of an embodiment of a system according to the invention. System 10 comprises contractor 12, customer 14, communication network 16, and system provider 18 further comprising provider module 20, further comprising one or more sub-modules 22 such as contractor module 22*a* and customer module 22*c*, and one or more data stores 24.

It is to be understood that each of contractor 12, customer 14 and system provider 18 may refer to a computing device and/or a party. By way of example, contractor 12 may be a company. Alternatively, contractor 12 may refer to a computing device, which may be used by a company, that accesses system provider 18.

System 10 may be used by contractor 12 and customer 14 to carry out a bidding process for performing assembly of various commodities, finished goods or services. The bidding process may generally involve customer 14 preparing an RFP which is the submitted and disseminated to one or more contractors 12. Each contractor 12 may then prepare a RFPR which, when finalized, is provided to customer 14. If such RFPR is selected by customer 14 (by factors to be determined by customer 14, but which may include pricing, standards, quality, scheduling, sub-components to be used) then the bidding process is complete and contractor 12 has been awarded the contract. Services that contractor 12 provides could include, but are not limited to, contract packaging services (such as where the customer desires assembly of one or more sub-components into finished goods, for example a gift basket of gift items), contract manufacturing (such as where the customer desires manufacturing of finished goods from one or more sub-components or base materials) or third-party logistics (such as where a third-party receives one or more sub-components and is responsible for distributing one or more sub-components or finished goods on a pre-determined schedule).

System 10 may be used by one or more, or substantially all, customers 14 and contractors 12 for one or more particular services or industries. As such, when a RFP is completed by customer 14, it may be provided directly to all contractors 12 that provide such services, or a subset of such contractors 12, based on criteria determined by one or more of contractors 12, customers 14 and provider system 18. When one or more of the one or more assemblers complete a RFPR, the RFPRs may be provided directly to customer 14. As described herein system 10 may allow this direct provision of the RFP and RFPR, such as by sending notifications to the appropriate party or by sending the RFP or RFPR document to the appropriate party. Notifications and document sending may be electronic, such as by email.

In addition to carrying out a bidding process, system 10 may be used by customer 14 or by one or more contractors 12 for setting up service provision (such as by an assembly line), obtaining required resources and sub-components, capacity planning, managing inventory, and monitoring the status of any of the above. The monitoring may additionally be in real-time.

System 10 may allow inventory tracking, possibly in conjunction with system 800. Such inventory tracking may be at any level of granularity, including pallet level, case level and unit level. Further, different finished goods and sub-components (that may or may not be part of the same finished good) can be tracked at different levels of granularity (ie some at pallet level and some at unit level). Tracking at more detailed levels of granularity, or tracking at all, may be difficult, particularly if movement through a warehouse occurs quickly. System 10 and system 800 may allow such tracking to occur more easily and more accurately.

System 10 may not only allow inventory tracking but also capacity planning and material requirements planning (which may involve obtaining resources such as sub-components on a required timeline), as described herein. Performing both inventory tracking and capacity planning may allow assembler 14 to achieve previously unachievable results in the converging field of warehouse management and manufacturing resource planning.

System 10 and in particular system provider 18, as described herein, may be offered in a software as a service (SaaS) model or architecture. Customer 14 and contractor 12 may access system 10 and system provider 18 via user IDs for logging in, or via other manners known in the art to restrict use of software systems to permitted users.

Customer 14 may be any entity that wants a finished good to be assembled or produced, such as via contractor 12. Customer 14 may be a company or an individual. Customer 14 may desire a system for creating and disseminating RFP for various finished goods that is efficient, comprehensive, widely accepted, accurate, provides thorough monitoring capabilities, enables more rapid collaboration and communication, and is inexpensive.

Customer 14, as described herein, may be located remotely from one or more of contractor 12 and provider system 18. Customer 14 may be any number of hardware configurations allowing customer 14 to access provider system 18. This could include customer 14 being substantially the same hardware as provider system 18 and/or contractor 12. In one exemplary embodiment, as shown in FIG. 1, customer 14 may be a personal computer (PC) which is configured to access provider system 18 over communication network 16.

Contractor or contractor 12 may be any entity that provides services relating to assembling and/or producing finished goods for customer 14. Contractor 12 may be an individual or may be a company involved in, for example, third-party logistics and fulfillment, private label packaging, contract packaging (such as made-to-order/customization, assembly and co-pack, and secondary packaging), contract manufacturing (such as contract fillers, primary packaging, flexible packaging), display and print (such as POP display, direct mail and lettershop) and brand owners and manufacturers.

Contractor 12 may desire a system, such as system 10, for creating and disseminating RFPRs for providing various services that is efficient, comprehensive, widely accepted, accurate, provides thorough monitoring capabilities and is inexpensive.

Contractor 12, as described herein, may be located remotely from one or more of customer 14 and provider system 18. Contractor 12 may be any number of hardware configurations allowing contractor 12 to access provider system 18. This could include contractor 12 being substantially the same hardware as provider system 18 and/or customer 14. In one exemplary embodiment, as shown in FIG. 1, contractor 12 may be a personal computer (PC) which is configured to access provider system 18 over communication network 16.

Communication network 16 (network 16) may be any network configured to allow one or more of customer 14 and contractor 12 to access provider system 18. Network 16 may any LAN or WAN and may be at least partially wired or wireless (including, for example, wireless Internet, RFID, Infra-red, or Bluetooth). Network 16 may be controlled by one or more of customer 14, contractor 12 and system provider 18 or may be controlled by a third-party network provider. Although shown, in FIG. 1, as one network cloud, network 16 may comprise one or more networks having one or characteristics and/or protocols. In one embodiment, network 16 may be the Internet. In a further embodiment, network 16 may be the Internet while other portions of network 16 are LANs located at one or more of customer 14 and contractor 12. In yet a further embodiment, network 16 may be a Virtual Private Network (VPN) implemented across geographically remote sites.

System provider 18 may be any entity that provides a system relating to facilitating assembling and/or producing finished goods. System provider 18 may be an individual or may be a company. System provider 18 may host one or more software modules configured to enable many tasks relating to assembling and/or producing finished goods. Such tasks may include creation and dissemination of RFPs and RFPRs, establishing one or more estimation production lines, production or virtual production lines (optionally through the use of templates or previously created production lines), capacity planning for one or more production lines, inventory tracking and management, and monitoring the progress regarding any of these tasks, including in real-time.

System provider 18 may have one or more modules and sub-modules (as described herein) to facilitate these, and other, tasks. It is to be understood that although one or more exemplary embodiments of various modules are described herein, any number of modules could be used and any module could offer different combinations of functionality. Further, although shown in FIG. 1 as being located at system provider 18 in one location, system provider 18 may have one or more locations, each of which could be remote or local with respect to customer 14 or contractor 12. In one exemplary embodiment, one or more modules of system provider 18 may be located at, or part of, customer 14. In a further embodiment, system provider 18 may provide one or more hardware components (such as pre-configured PCs or computer terminals) to contractor 12. Such hardware components may have software modules that perform one or more of the above mentioned tasks. In this way, system provider 18 may be able to take these hardware components to contractor 12 or customer 14 and have an "off the shelf" system not requiring substantial set up time.

System provider 18 may be remote from customer 14 and/or contractor 12.

System provider 18 may further comprise contractor module 22a and customer module 22c. These modules provide substantially all of the functionality relating to the tasks referenced above. As described herein, these modules may have different arrangements of functionality while remaining with the scope of the present invention.

Customer module 22c may substantially be the module used by customer 14 to access system provider 18. As such, assembler module 22c may provide one or more user screens (as described herein) to allow customer 14 to create a RFP, disseminate a RFP, receive and view one or more RFPRs, provide or alter capacity requirements, and monitor production, inventory levels, and other information—optionally in real time.

Customer module 22c may store information in one or more data stores 24 and access information from one or more data stores 24. Through one or more user screens, customer module 22c may further store information provided by customer 14, such as via one or more customer inputs which may occur via keystrokes or mouseclicks, in one or more data stores 24 and may display information obtained from one or more data stores 24 to customer 14.

Assembler module 22a may substantially be the module used by contractor 12 to access provider system 18. As such, assembler module 22a may provide one or more user screens (as described herein) to allow contractor 12 to receive a RFP, create a RFPR, provide a RFPR, schedule resources, provide or alter capacity requirements, and monitor production, inventory levels, and other information—optionally in real time. Assembler module 22a may be referred to as contractor module 22a.

Assembler module 22a may store information in one or more data stores 24 and access information from one or more data stores 24. Through one or more user screens, assembler module 22a may further store information provided by contractor 12, such as via one or more customer inputs which may occur via keystrokes or mouseclicks, in one or more data stores 24 and may display information obtained from one or more data stores 24 to contractor 12.

Data stores 24 may store data relating to system 10 and any tasks or functionality provided by system provider 18 and assembler module 22a and customer module 22c. Data stores may be provided data from assembler module 22a and customer module 22c by contractor 12 and customer 14 providing data for example via user screens. Data stores 24 may further obtain data from one or more of contractor 12 and customer 14, via assembler module 22a and customer module 22c, without user interactions, as described herein. Data in data stores 24 may be in any format and organized in any way known to those of skill in the art.

Data stores 24 may store data comprising one or more libraries of RFPs. Such libraries may be organized or searchable based on contractor 12, customer 14, the nature of the service provided, the nature of the production line, and whether the RFP was successfully responded to. In one embodiment, each customer 14 may have a library of their own RFPs. Such library may allow customer 14, via for example RFP terminal 14*a* and customer module 22*c*, to access an old RFP and modify the RFP to create a new RFP. The use of RFP libraries may make RFPR creation easier, more efficient, and more uniform.

Similarly, data stores 24 may store data comprising one or more libraries of RFPRs. Such libraries may be organized or searchable based on contractor 12, customer 14, the nature of the service provided, the nature of the production line, and whether the RFPR was chosen by customer 14. In one embodiment, each contractor 12 may have a library of their own RFPRs. Such library may allow contractor 12, via for example RFP terminal 108 and assembler module 22*a*, to access an old RFPR and modify the RFPR to create a new RFPR. The use of RFPR libraries may make RFPR creation easier, more efficient, and more uniform.

Data stores 24 may store numerous other types of data including RFP and RFPR data and templates, transactional data, inventory data, resource data, and capacity data.

As used herein, transactional data or transaction data is any data that gives a more accurate view of any aspect of the assembly process including, for example, ordering and receiving sub-components (which may also be part of resource data and inventory data), storing sub-components, bringing sub-components to the assembly line, details about the assembly line (labor costs, employees and their performance, machine operation such as outputs from machines on the assembly line that may be inputs to system provider 18, efficiency, production performance results and trends—all of which may be part of inventory data, resource data, capacity data, and assembling one or more finished goods) and resultant finished goods and by-products (wasted sub-components or other details—which also may be part of inventory data). Transaction data may be substantially real-time data and may allow system provider 18 to provide an accurate snapshot of the assembly process and also to show the transactions that occurred that led to the snapshot. Transaction data may substantially allow re-creation of substantially the entirety of the assembly process from the start of the process until the current state.

The more granular and cleaner the transaction data, the better the re-creation may be. However, more granular data may be harder to keep "clean"—where the data accurately represents the state of the inventory and warehouse.

System 10 and one or more modules thereof may have one or more techniques for maintaining cleanliness and granularity while maintaining performance and usability. For example, system 10 may track data at one or more levels of granularity and only display a subset of the one or more levels, which subset may be selected by customer 14 or contractor 12. Further, highly granular inventory adjustments that sum to zero (such as three units of sub-component A being removed from an inventory storage location 812 and three units of sub-component A entering the same inventory storage location) would be ignored, though identifiers may still be tracked such as for expiry and traceability purposes.

Transaction data and other data may be provided by human beings (as user inputs), either at customer 12 or assembler 14, or may be provided by machines, sensors and other electronic means (as machine inputs) that may be located at contractor 12 or customer 14, as described herein.

Capturing and storing transaction data may allow many beneficial uses. By way of example, transaction data may allow complete traceability of all movement, shipment, receipt, production and consumption of sub-components and other inventory or resources. It may allow automatic optimization of warehouse layout and inventory storage location assignments for each sub-component. Users may determine what was in the warehouse yesterday, last month and the throughput of the warehouse at any stage. Transaction data may reveal what goods are the fastest moving and which sit in inventory longest. Further, erroneous activity can be rolled back to keep the data clean. Employees' productivity, production line efficiency and productivity, and which sub-components are rejected the most can be monitored and studied. The cleaner the transaction data is and the more granular the transaction data is the more useful the transaction data may be in providing the above benefits.

Transaction data may comprise data that allows one or more physical items (such as sub-components and finished goods) to be tracked on a 'per transaction' basis at any level of granularity. A transaction may occur whenever a physical item moves within a warehouse. By way of examples each of the following movements could constitute a transaction for a physical item: arrival at a warehouse receiving area and subsequent departure from the receiving area (this may be tracked similarly to financial debits and credits, where a departure from one has a corresponding arrival at another), arrival to and departure from one or more storage locations within a warehouse, arrival to and removal from a work-in-progress area (WIP) which may be a production line, becoming part of a finished good or being a wasted item, moving to a shipping location, and leaving the warehouse. In addition, each transaction (which may comprise one or more pieces of transaction data) and each piece of transaction data, may be made up of one or more very granular adjustments to inventory such as inventory 808. By way of example, transaction data may include moving 10 finished goods, on a pallet, to shipping. Granular adjustments included in such transaction data may reflect individual sub-components in each finished good, waste or resources that were used, and other more granular details of the larger transaction.

Physical items, such as inventory 908, may be tracked (meaning that at least some transactional data exists) at any level of granularity including pallet level, cases, units and 'eaches'. Physical item tracking can be at different levels of granularity for any sub-components or finished goods and data stores 24 and system provider 18 can simultaneously track at different levels. By way of example, 2 pallets may arrive at receiving and may both contain sub-component A and sub-component B. One pallet may be moved to an inventory storage location and may be tracked as a pallet, with transactional data captured relating to the pallet move (transaction data in this case may comprise one or more item identifiers, lot codes, expiry dates, SKU numbers, unit quantity, unit of measure, status, timestamp, receiving location identifier, storage location identifier, and machine and machine operator that moved the pallet). The other pallet may be separated into cases of sub-component A and sub-component B and moved to different inventory storage locations 812. Each case could then be tracked separately, while the pallet could still be tracked (the pallet could be tracked to move to two locations, knowing based on the case tracking what parts of the pallet went to which inventory storage location).

Figure 14:
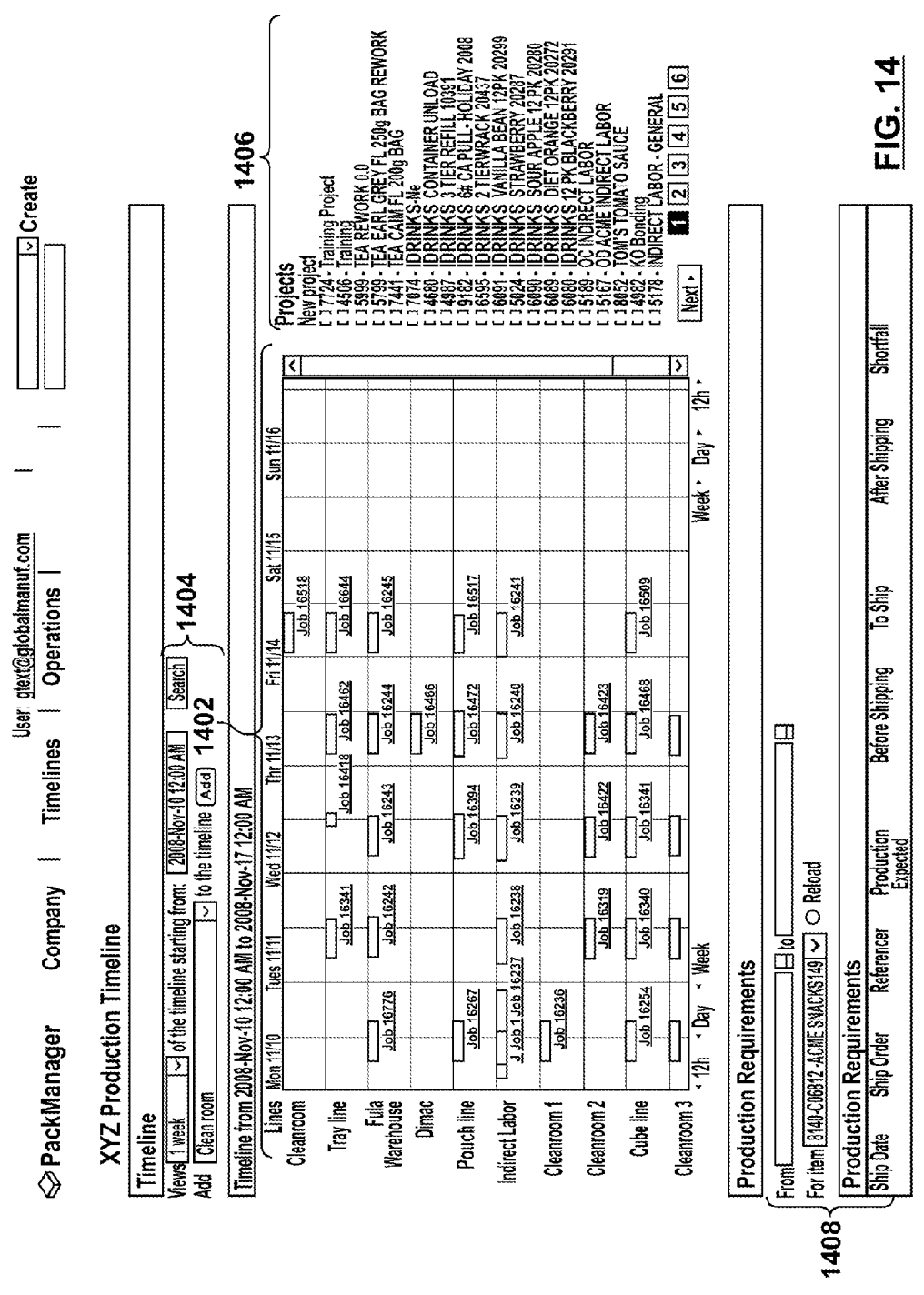

Inventory 808 may be in, for example, one or four states: available (inventory that can be converted into finished goods), reserved (such may indicate that the inventory already has a purpose so cannot be used for new finished goods or other purposes), quarantine (which may indicate that it is part of a recall or should otherwise likely not be used) or rejected. All warehouse concepts, terminals and systems can introduce transactions in all four states. These statuses may be visible in one or more user screens, as shown in FIGS. 12-14.

This may provide a mechanism to differentiate distinct inventory types with essentially the same BAS.

Transactional data may further comprise data relating to capacity planning, resource availability, and production line progress (such as how long a step in the process took, how many employees are working and what their productivity is, and how many sub-components are being wasted), lead times for products to be delivered, shift details, cut-off times for how soon sub-components may be in the warehouse before production begins, statuses for re-ordering sub-components, or when a project will have its required resources.

An internally consistent implementation of transaction data may rely on a few basic principles when new transactions are introduced into the system. First, at least some common data relating to a transaction must be captured (for example the pallet, location, SKU, expiry date, lot code, timestamp, and status—though different data may be used). This may be referred to as a "base attribute set" or BAS. Secondly, transactions (and the related captured transaction data) may be grouped to derive more aggregate information. For example, determining the total quantity of a SKU at a location could involve summing all transactions that reference a given SKU and a given location. Thirdly, transactions cannot be modified in such a way that affects historical levels of inventory. For instance, the modification of a receipt quantity that occurred two weeks ago will generate new transactions at the current time rather than modify existing transactions. Lastly, inventory cannot generally be negative in any location. There may be an exception, as described herein, relating to the back-flushing of subcomponents in the work-in-progress (WIP) area of the warehouse.

Customer's Interaction with System Provider

Figure 2:
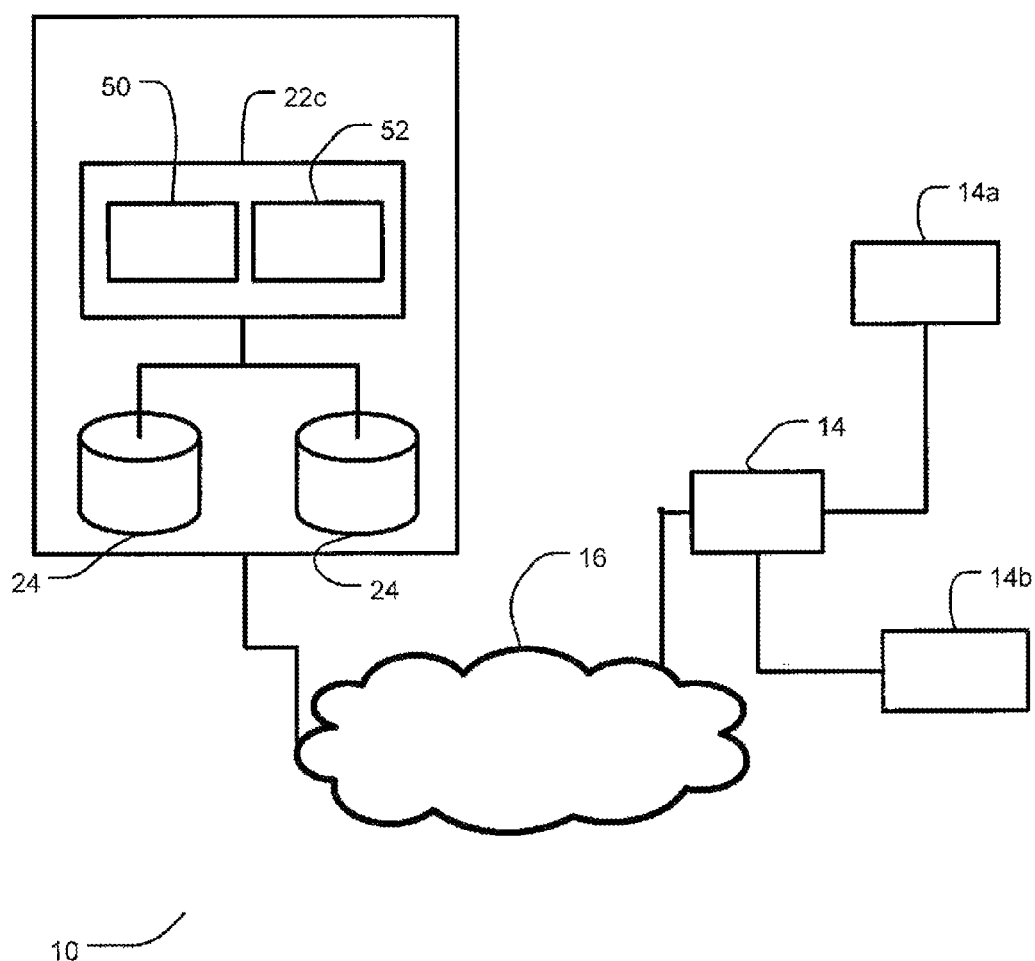
FIG. 2 is a further diagram of an embodiment of a system according to the invention.

FIG. 2 is a diagram of an embodiment of system 10 according to the invention. System 10 comprises communication network 16, customer 14 further comprising RFP creation terminal 14a and monitoring terminal 14b, system provider 18 further comprising customer module 22c further comprising RFP creation module 50, and monitoring module 52, and data stores 24. It is to be understood that like references are used herein to refer to like elements.

Customer 14 may be substantially as described herein and may comprise RFP creation terminal 14a and monitoring terminal 14b. RFP creation terminal 14a and monitoring terminal 14b may be the same terminal or may be separate terminals. Further, there may be one or more of each terminal and each may be able to perform substantially the same functionality as others. RFP creation terminal 14a and monitoring terminal 14b may be configured to receive one or more user screens from customer module 22c and display them to a user at customer 14, as described herein.

RFP creation terminal 14a and monitoring terminal 14b may be one or more computing devices that may be used by customer 14 or users in its procurement, project management, business, or other departments. RFP creation terminal 14a and monitoring terminal 14b may be located at customer 14, at system provider 18 or at a third-party location.

RFP creation terminal 14a and monitoring terminal 14b may substantially be customer 14 or may be in communication with customer 14, as shown in FIG. 2, by a communication network which may be the same as, or similar to, network 16.

RFP creation terminal 14a may be used by a user to create a RFP and disseminate the RFP. This may occur via user screens 1102 being provided by RFP creation module and displayed on RFP creation terminal 14a. Exemplary user screens 1102 may be seen in FIGS. 11A-E.

Monitoring terminal 14b may allow monitoring one or more aspects of the assembly process, including assemblers' progress in preparing a RFPR, inventory levels, numbers of finished goods, production projections, transaction data, and any other required information. Monitoring terminal 14b may view production dashboard 1300 in FIG. 13 to monitor production. Alternatively, monitoring terminal 14b may view user screens 1102 in FIGS. 12A-E to monitor production.

Customer module 22c may further comprise RFP creation module 50, and monitoring module 52.

RFP creation module 50 may allow customer 14 to create a RFP possibly using RFP creation terminal 14a. RFP creation module 50 may provide an assessment of the completion or quality of the RFP to ensure the comprehensiveness of the RFP. RFP creation module 50 may present one or more user screens to customer 14 on RFP terminal creation terminal 14a. These user screens may allow customer 14 to optionally select an old RFP from a library in data stores 24 to begin creating a new RFP. Alternatively customer 14 may simply begin entering required information for the RFP onto one or more user screens provided by RFP creation module 50. Such information may include a RFP name, personnel involved in the process, production required, details about the sub-components or finished goods, shipping arrangements and configurations, measurements, warehousing requirements, status updates and codes, or the like.

Customer 14 may indicate, such as via a submit button, to save the RFP. This may create the RFP or merely save it for further modifications via further user screens for example. Customer 14 may further be able to disseminate the RFP upon completion. Customer 14 may select a disseminate button, at which point RFP creation module 50 may provide the RFP to one or more contractors 12. By way of example, upon selecting disseminate, RFP creation module 50 may access data stores 24 to obtain a list of assemblers that customer 14 wishes to receive the RFP. The list may include email addresses to send the RFP to, or may include user IDs so that the next time that contractor 12 accesses system provider 18 they can view the RFP. Customer 14 may be able to specify further contractors 12 to distribute the RFP to. RFP creation module 50 may allow customer 14 to not have to spend any substantial time in disseminating the RFP.

RFP creation module 50 may allow customer 14 to create substantially any type of RFP desired and allows customer 14 to specify one or more requirements (such as capacity requirements) for contractor 12 RFPRs to meet. Such requirements may include a price per finished good, a time for completion or delivery date, quality or operational standards, the maximum wasted or destroyed sub-components. Additionally RFP creation module 50 may allow customer 14 to create a RFP with one or more scenarios. Each scenario may address or specify different requirements for an RFP to meet.

Monitoring module 52 may allow customer 14 to monitor the assembly process possibly using monitoring terminal 14b. Monitoring module 52 may present one or more user screens to customer 14 on monitoring terminal 14b. These user screens may allow customer 14 to optionally select an aspect of the assembly process to monitor, and then begin monitoring. Additionally, monitoring module 52 may allow customer 14 to add or amend requirements to the RFP or to one or more scenarios of an RFP. By way of example, monitoring module 52 may allow customer 14 to shorten timelines, or change the number of finished goods desired. This may be done at any time during the production process.

Service Provider/Assembler's Interaction with System Provider

Figure 3:
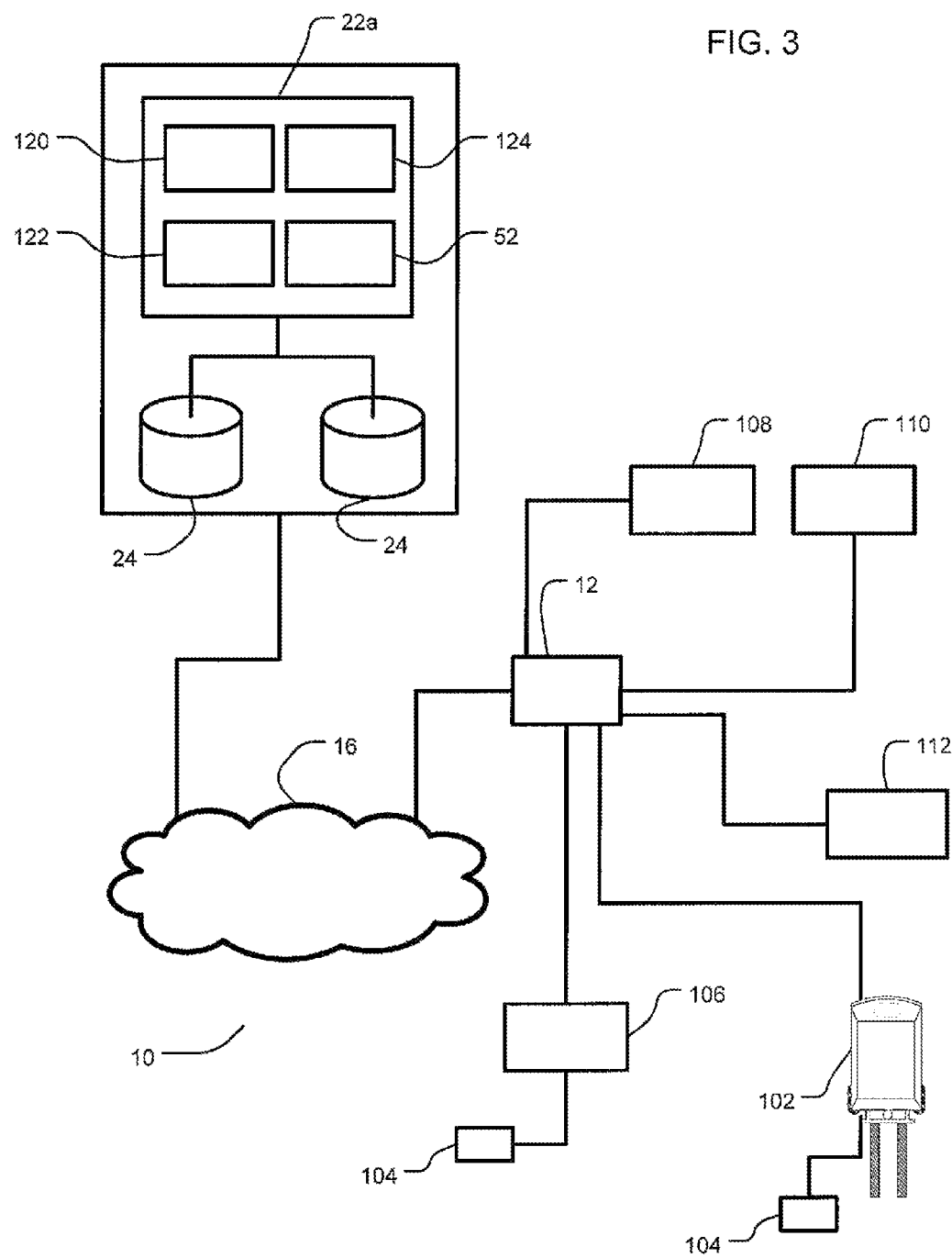
FIG. 3 is a further diagram of an embodiment of a system according to the invention.

FIG. 3 is a diagram of an embodiment of a system according to the invention. System 10 comprises communication network 16, contractor 12 further comprising machine terminal 102 further comprising machine computing device 100 and peripheral 104, warehouse terminal 106 further comprising peripheral 104, RFP response terminal 108, production line equipment 110, production terminal 112, system provider 18 further comprising assembler module 22a further comprising production module 120, monitoring module 50, RFPR module 122, and inventory management module 124, and data stores 24.

Machine terminal 102, warehouse terminal 106, RFP response terminal 108, production line equipment 110, and production terminal 112 may be connected by a communication network which may be the same as, or similar to, network 16. Machine terminal 102, warehouse terminal 106, RFP response terminal 108, production line equipment 110, and production terminal 112 may be connected directly to system provider 18 via network 16 or may communicate via a local network (not shown) at contractor 12 that then communicates with system provider 18 via network 16.

RFP response terminal 108 and production terminal 112 may be the same terminal or may be separate terminals. Further, there may be one or more of each terminal and each may be able to perform substantially the same functionality as others. RFP response terminal 108 and production terminal 112 may be configured to receive one or more user screens from assembler module 22a and display them to a user at contractor 12, as described herein.

RFP response terminal 108 and production terminal 112 may be one or more computing devices that may be used by assembler or users in its procurement, project management, business, or other departments. RFP response terminal 108 and production terminal 112 may be located at contractor 12, at system provider 18 or at a third-party location.

RFP response terminal 108 and production terminal 112 may substantially be contractor 12 or may be in communication with contractor 12, as shown in FIG. 3, by a communication network which may be the same as, or similar to, network 16.

RFPR terminal 108 may allow contractor 12 to receive a RFP, and create and distribute an RFPR, possibly using RFPR module 122.

Production terminal 112 may allow contractor 12 to create a production line and do capacity planning, possibly using production module 120.

Machine terminal 102 may enable moving one or more physical items (such as sub-components and finished goods) in units such as pallets, cases, or eaches. Machine terminal 102 may be located in a warehouse at contractor 12 and each warehouse may have one or more machine terminals 102.

Machine terminal 102 may allow tracking of the movement of physical items and capturing of transaction data. Transaction data may be captured when the physical item is acquired and when it is deposited in a new location. Such capturing and tracking may be via machine computing device 100 and peripheral 104. Machine terminal 102 may be in communication, directly or indirectly, with inventory management module 124 of assembler module 22a. In one embodiment machine terminal 102 may be in communication with assembler module 22a directly via network 16. In a further embodiment machine terminal 102 may communicate with another terminal, such as production terminal 112, which may then communicate with assembler module 22a of system provider 18.

Machine terminal 102 may include one or more computing devices to allow a user to enter transaction data relating to the physical items being moved.

In one embodiment, machine terminal 102 may be a forklift with a computing device mounted on it and peripheral 104 may be a barcode scanner that can scan the physical item. When a forklift operator loads the physical item for removing from a first location the location may be scanned or keyed in manually, then the physical item may be scanned and the transaction data is provided, for example, to assembler module 22a. At the same time, a warehouse terminal 106 may scan the physical item to indicate it is leaving the first location. When the forklift operator unloads the physical item at a second location the physical item is again scanned and the transaction data is provided, for example, to assembler module 22a. At the same time, a warehouse terminal 106 may scan the physical item to indicate it is arriving at the second location.

In a further embodiment, physical items may have a transmitter (such as an RFID transmitter) and machine terminal 102 may include a receiver to automatic receive information from the physical item to be moved. In still further embodiments, physical items may have barcodes that allow tracking, or be part of a voice recognition system allowing provision of provide transaction data about the physical item to be moved.

Warehouse terminal 106 may be located at one or more inventory storage locations 812 at contractor 12 and may substantially be one or more computing devices; each warehouse may have one or more warehouse terminals 106.

Warehouse terminal 106 may allow tracking of the movement of physical items and capturing of transaction data. Transaction data may be captured when the physical item is brought to the geographic area of warehouse terminal 106 and when the physical item is removed from the geographic area of warehouse terminal 106. Warehouse terminal 106 may further allow a user to enter transaction data relating to the physical items being moved. Such capturing and tracking, and entering of transaction data may involve peripheral 104.

Warehouse terminal 106 may be in communication, directly or indirectly, with inventory management module 124 of assembler module 22a. In one embodiment warehouse terminal 106 may be in communication with assembler module 22a directly via network 16. In a further embodiment warehouse terminal 106 may communicate with another terminal, such as production terminal 112, which may then communicate with assembler module 22a of system provider 18.

Warehouse terminal 106 may be located in various areas of the warehouse to facilitate warehouse workers using them to capture and enter transaction data.

In one embodiment, warehouse terminal 106 may be a PC with a barcode scanner that can scan the physical item. Warehouse terminals 106 may be located at a receiving location 810 (such as receiving terminal 806/106), one or more inventory storage locations 812, one or more WIP 816 (such as WIP terminal 826/106) and one or more shipping locations 824 (such as shipping terminals 822/106). When a physical item is to be removed from a first location, such as receiving location 810, the physical item (such as inventory 908) is scanned and the transaction data is provided, for example, to assembler module 22a. When the physical item arrives at a second location, such as inventory storage location 812, the location can be scanned or entered manually and then the physical item is again scanned and the transaction data is provided, for example, to assembler module 22a. It is to be understood that at least some of the collection of transaction data may be done by manual methods, such as by writing down transaction, and later entering this transaction data into a terminal such as warehouse terminal 106.

Production line equipment 110 may be any computing device, equipment, sensors or other machinery that is part of a production line. Production line equipment may include, but is not limited to, computing devices, wrapping machines, sealing machines, laser coding machines, labeler, sorting/collating machines, inserting machines, cutting devices, folding devices, filling devices, and waste and damaged goods receptacles. Production line equipment may be used for performing one or more steps of production and/or for tracking data related to same, such as transaction data. Production line equipment 110 may be located at the production line, and each production line may comprise one or more production line equipments 110.

Production line equipment 110 may allow tracking of the movement of physical items and capturing of transaction data. Transaction data may be captured when the physical item is brought to the geographic area of Production line equipment 110 or when production line equipment 110 operates on a sub-component or other physical item. Production line equipment 110 may further allow a user to enter transaction data relating to the physical items being moved.

Production line equipment 110 may be in communication, directly or indirectly, with inventory management module 124 of assembler module 22a. In one embodiment warehouse terminal 106 may be in communication with assembler module 22a directly via network 16. In a further embodiment warehouse terminal 106 may communicate with another terminal, such as production terminal 112, which may then communicate with assembler module 22a of system provider 18.

Assembler module 22a may further comprise production module 120, monitoring module 50, RFPR module 122, and inventory management module 124. It is to be understood that although described as separate modules, they may essentially be the same module and any functionality of one may be implemented by other modules, or by multiple modules. Further, although shown in FIG. 3 as being in one location and on system provider 18, it is to be understood that one or more modules may be on separate computing devices and may be in one or more remote locations, including at contractor 12 and customer 14.

Monitoring module 52 may be substantially as described herein. Monitoring module 52 may be accessible by both customer 14 and contractor 12. Monitoring module 52 may be part of assembler module 22a or customer module 22c, or both. Monitoring module 52 may present one or more user screens to contractor 12 or customer 14 that may display information about the assembly process. One exemplary user screen may be seen in FIG. 13.

RFPR module 122 may substantially be the module used by contractor 12 to create and distribute an RFPR, possibly using RFPR terminal 108. RFPR module 122 may allow for creation and distribution of a completely new RFPR, or one based on an old RFPR.

RFPR module 122 may be accessible by particular employees of contractor 12, such as salespeople. This access control may be implemented, for example, through the use of user IDs with RFPR module 122 in particular or system provider 18 generally. It is to be understood that any one or more modules in the present invention may have access control that may be implemented through the use of user IDs. Such access may be to any one or more modules or to system provider 18 generally.

RFPR module 122 may present one or more user screens, such as those shown in FIGS. 12A-E, to contractor 12 on RFPR terminal creation terminal 108. These user screens may allow contractor 12 to optionally select an old RFPR from a library in data stores 24 to begin creating a new RFPR. Data from the selected old RFPR may be presented on a user screen to provide a starting point for the new RFPR. Alternatively contractor 12 may simply begin entering required information for the RFPR onto one or more user screens provided by RFPR module 122. Information required to be entered may include general information to identify the RFPR, scenario details such as finished goods and sub-component descriptions, volumes required and status of the scenario, pricing information (which may include one or more price schedules), and assembly or production steps (with or without information about production line equipment 110 used).

RFPR module 122 may store information in one or more data stores 24 and access information from one or more data stores 24. Through one or more user screens, assembler module 22a may further store information provided by contractor 12 in one or more data stores 24 and may display information obtained from one or more data stores 24 to contractor 12.

RFPR module 122 may allow contractor 12 to create substantially any type of RFPR desired and allows contractor 12 to design the RFPR to comply with one or more requirements outlined in the RFP that the RFPR is responsive to, such as capacity requirements.

Additionally RFPR module 122 may allow customer 14 to create a RFPR with one or more scenarios. Each scenario may specify different requirements for an RFP to meet. By way of example, an RFPR may have a scenario if 10,000 finished goods are required and a separate scenario if 100,000 finished goods are required. In such an example, the pricing schedules for the two scenarios may be different because of volume discounts that can be achieved when purchasing larger quantities of each sub-component.

The scenarios that are created with the RFPR by contractor 12 and RFPR module 122 may not be able to function as production lines. However, RFPR module RFPRs and scenarios can be imported to production module 120 to become production lines.

Contractor 12 may indicate, such as via a submit button, to save the RFPR. This may create the RFPR or merely save it for further modifications via further user screens for example. Contractor 12 may further be able to disseminate the RFPR upon completion. Contractor 12 may select a disseminate button, at which point RFPR module 122 may provide the RFPR to the customer 12 that issued the RFP. By way of example, upon selecting disseminate, RFPR module 122 may email the RFPR to specified email addresses of customer 14 or send a notification to customer 14, such as to customer's 14 system user IDs or selected cellular phones by SMS message, so the next time customer 14 accesses system provider 18 they can view the RFPR. RFP module 124 may allow contractor 12 to not have to spend any substantial time in disseminating the RFPR.

Production module 120 may substantially be the module used by contractor 12 to create a project (a project may be similar to a work order to perform services won through a RFP process) that may contain one or more production lines and one or more jobs for the one or more production lines (a job may be a scheduling of a portion of the total production that is to occur), perform capacity planning for the one or more production lines, and monitor production, possibly using production terminal 112. Production module 120 may allow creation of a new production line, converting a production line from a RFPR into a production line, or using an old production line that may be accessed from a library of production lines stored in data stores 24. Production module 120 may allow the creation of "master data" or libraries, such as lists of customer, location, and item details.

Production module 120 may be accessible by particular employees of contractor 12, such as project managers and procurement. This access control may be implemented, for example, through the use of user IDs with production module 120 in particular or system provider 18 generally.

Production module 120 may present one or more user screens, as shown and described with respect to FIG. 11B and UIB 1106g and FIGS. 12A-E, to contractor 12 on production terminal 120. These user screens may allow contractor 12 to optionally select a scenario from the RFPR contractor 12 previously submitted to customer 14 in response to customer's 14 RFP. Alternatively these user screens may allow contractor 12 to select an old production line from a library in data stores 24 to alter for the present production, or to begin creating a new production line. Data from the selected scenario or old production line may be presented on a user screen to provide a starting point for the new production line. This may make creation of a production line more efficient and accurate. Alternatively contractor 12 may simply begin entering required information for the production line onto one or more user screens provided by RFPR module 122.

Production module 120 may store information in one or more data stores 24 and access information from one or more data stores 24. Through one or more user screens, assembler module 22a, and production module 120 in particular, may further store information provided by contractor 12 in one or more data stores 24 and may display information obtained from one or more data stores 24 to contractor 12.

Production module 120 may allow contractor 12 to create substantially any type of production line desired and allows contractor 12 to design the production line to comply with one or more requirements outlined in the RFP. If contractor 12 converts a scenario from the RFPR into a production line, the requirements, such as capacity requirements and labor requirements may already be met as they may have been met by the RFPR production line.

In order to meet requirements, production module 120 may be used to identify all resources that will be required for the finished good. Such may include employees, machines, energy and fuels, sub-components, space (such as warehouse space), and time. The resources, both what are planned (such as those sub-components that are to be ordered, employees to hire) and what may currently be scheduled (such as sub-components already ordered, machines already in place etc), may be provided to production module 120 as resource inputs and may be used to ensure requirements will be met, or are being met. Production module 120 may further be used to identify how long it will take to acquire those resources—such as how long it will take to have one or more sub-components delivered whether they are ordered already or not. As such, production module 120 may have all required information to ensure requirements are met. Production module 120 may be presented on one or more user screens 1102, as shown and described with respect to FIG. 14, to allow contractor 12 to ensure requirements are met. Such may be accomplished, for example, using a Gantt chart that contractor 12 can alter and adjust (such as making an order for a sub-component earlier so that it arrives on time) to meet production. Assembler can target any requirement and the user screen or Gantt chart can be updated to allow contractor 12 to adjust it to meet the requirement. In an alternative, such as if a new production line is required by the new or altered requirement, a new Gantt chart may be created and displayed. By way of example, a first screen may have as a requirement 10,000 finished goods in 2 months at $1.50/finished good. However, a new requirement of 10,000 finished goods in 1.5 months at a unit price of $2.00 may require a new chart with a focus on earlier delivery (such as expediting delivery of commodities or hiring more skilled and faster workers).

Production module 120 may also be used, possibly in conjunction with other modules and/or system 800, to implement one or more concepts of Drum-Buffer-Rope manufacturing or assembly. Although such concepts may be implemented in other modules (such as in RFPR module for creating a RFPR), such concepts may principally be applied to actual production using one or more production lines. Such concepts may be monitored and reported on, for example, via monitoring module 52 and monitoring terminal 14a or production terminal 112. In such concepts, the Drum may be the WIP (and the process or processes implemented there), the Buffer may be a measurement of sub-component supply (number of units, amount of time production can continue etc) and the Rope may be a rate of ordering or replenishing a sub-component or other resource, which may be tied to a production rate for example. Each production line could implement Drum-Buffer-Rope concepts for one or more sub-components or resources, separately or in conjunction with each other. It is to be understood that some, or all, of the required inputs (WIP data, receiving data etc) may be provided by system 800, manually or via another warehouse system. Some or all of the required outputs (such as placing orders) may be provided by system 800, production terminal 112, shipping terminal 822/106, or warehouse terminal 106, and may occur with or without human intervention. By way of example, customer 14 or contractor 12 may monitor a production line or WIP (which may be a buffer) and observe Drum-Buffer-Rope data. This may indicate to them that further sub-components need to be ordered and they may continue to make such orders.

Additionally production module 120 may allow customer 14 to create a project with one or more scenarios. Each scenario may specify different requirements for a production line to meet. By way of example, a project may have a production line to complete the required finished goods in two months and a production line to complete the required finished goods in 1 month. In such an example, various items in the pricing schedules for the two scenarios may be different (such as labour costs as more people, more skilled people or a night shift may be required) or other aspects of the production lines may be different (such as the layout of the production line as more or different machines may be required to get finished goods more quickly). If requirements change, a production line can be changed to meet the new requirements (such as adding a night shift so a production line keeps running) or a new production line can be added to the project. A new production line may be added, for example, if the new requirement presents a more fundamental change to the process (such as if new sub-components are added to the finished good). Requirement changes may be specified by contractor 12 or customer 14 and may be made using one or more user screens presented by production module 120, RFP module 124 or monitoring module 52, on production terminal 112 or monitoring terminal 14a.

Production lines may capture what actually occurs in production while scenarios may capture projections or expected results. As such, and in particular when scenarios are converted into production lines, comparison of results between production lines and scenarios may provide valuable analytical data, such as for continuous improvement and lean manufacturing. Such comparison may be particularly valuable when data is one or more of more granular, cleaner and more real-time. Additionally, such production lines may capture transaction data reflecting what actually occurs in production. Such transaction data may offer benefits as described herein and may allow for more meaningful improvement and lean manufacturing. For example it may allow tracing, visually or otherwise, the movement of sub-components, people, or finished goods to detect and fix inefficient movement. As another example, transaction data may allow a determination that inventory levels are too high and one or more sub-components should be ordered less frequently or in smaller volumes as they tend to remain in inventory storage locations 812 too long.

Inventory management module 124 may substantially be the module that tracks inventory in a warehouse at contractor 12. Inventory management module 124 may track and manipulate data to ensure that clean data is achieved and maintained. Inventory management module 124 may receive transaction data, store transaction data in data stores 24, and obtain transaction data from data stores 24. Transaction data may be received, directly or indirectly, from for example, from system 800 (such as from one or more of machine terminal 102, warehouse terminal 106, RFP response terminal 108, production line equipment 110, and production terminal 112) or another WMS system.

Inventory management module 124 may provide information to one or more other modules of assembler module 22a and customer module 22c, such as monitoring module 52 and production module 120.

Inventory management module 124 may present one or more user screens to contractor 12 for example on production terminal 120 or to customer 14 for example on monitoring terminal 14b. This may be to allow monitoring of inventory data and/or transaction data. Alternatively, inventory management module 124 may provide transaction data to one or more other modules, such as monitoring module 52 or production module 120, to be presented on one or more user screens by those modules.

RFP/RFP Response Creation and Distribution

Figure 4:
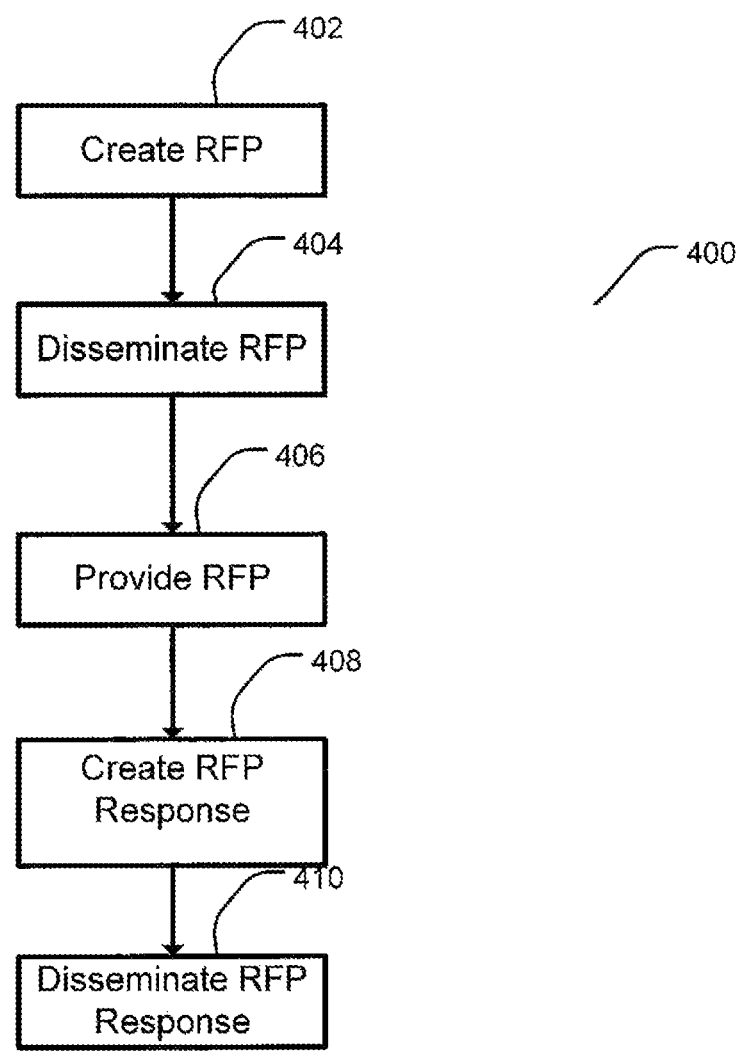
FIG. 4 is a flow chart of an embodiment of a method for RFP submission and response according to the invention.

FIG. 4 is a flow chart of an embodiment of process 400 for RFP submission and response. Process 400 allows creation of a RFP, such as by a customer (like customer 14) to create an RFP, and dissemination of the RFP. Process 400 further allows creation of a RFPR, such as by an assembler (like contractor 12) and dissemination of the RFPR.

Process 400 begins at 402 where a RFP is created. This creation may occur through the use of system provider 18 and in particular RFP creation module 50 and RFP terminal 14a. Creation may involve providing information about the RFP such as described herein relating to RFP creation module 50. As described herein, creation may involve using templates from previous RFPs and scenarios. Creation at 402 may further involve saving the RFP, such as to data stores 24, which may indicate that the RFP is ready for dissemination.

Process 400 continues at 404 where the RFP is disseminated. Dissemination may involve providing the RFP to one or more contractors 12 who may wish to respond to the RFP with an RFPR. Dissemination may involve sending the RFP to one or more contractors 12, for example via email. Alternatively, contractors 12 may receive a notification or be able to view the RFP when they next access system provider 18, assembler module 22a or RFP creation module 50. Dissemination may require little or substantially zero interaction from a user. Despite desiring dissemination to many contractors 12, dissemination at 404 may be performed solely by system provider 18 and not require time or effort from a user such as customer 14, that may have prepared the RFP. In one embodiment, system provider 18, and one or more of RFP creation module 50 and RFPR module 122, may use one or more words in the RFP as keywords to search for contractors 12 that should automatically receive the RFP. By way of example, the RFP may describe the finished good as a "basket". System provider 18 may search for any contractors 12 that indicate they are capable of assembling baskets. This indication may be stored, for example, in a profile of contractor 12 that may be stored in data stores 24. As a further example, system provider 18 may search for similar RFPs that have already been responded to and send the new RFP to those contractors 12 that responded to the similar RFPs. It is to be understood that many other criteria or keywords may be used or searched.

At 406 the RFP is provided to one or more contractors 12 that may view the RFP and decide whether to reply to it. Providing at 406 may occur at RFPR terminal 14b or wherever the RFP is emailed to.

At 408 one or more RFPRs may be created in response to the RFP. This may occur, for example, using RFPR module 122 and RFPR creation terminal 108. Creation of the RFPR may involve providing information about the RFPR such as described herein relating to RFPR module 122. Creation at 408 may further involve saving the RFPR, such as to data stores 24, which may indicate that the RFP is ready for dissemination. It is to be understood that neither the RFP nor the RFPR need to created all at once. Using system provider 18, and in particular data stores 24, a partially completed RFP or RFPR may be saved to be completed at a later time.

Process 400 continues to 410 where the one or more RFPRs is disseminated. Dissemination may involve providing the RFPR to customer 14 that had disseminated the RFP. Dissemination may involve sending the RFPR for example via email. Alternatively, customer 14 may receive a notification or be able to view the RFPR when they next access system provider 18, customer module 22c or RFP creation module 50. Dissemination may require little or substantially zero interaction, time or effort from a user and may be performed solely by system provider 18.

Figure 5:
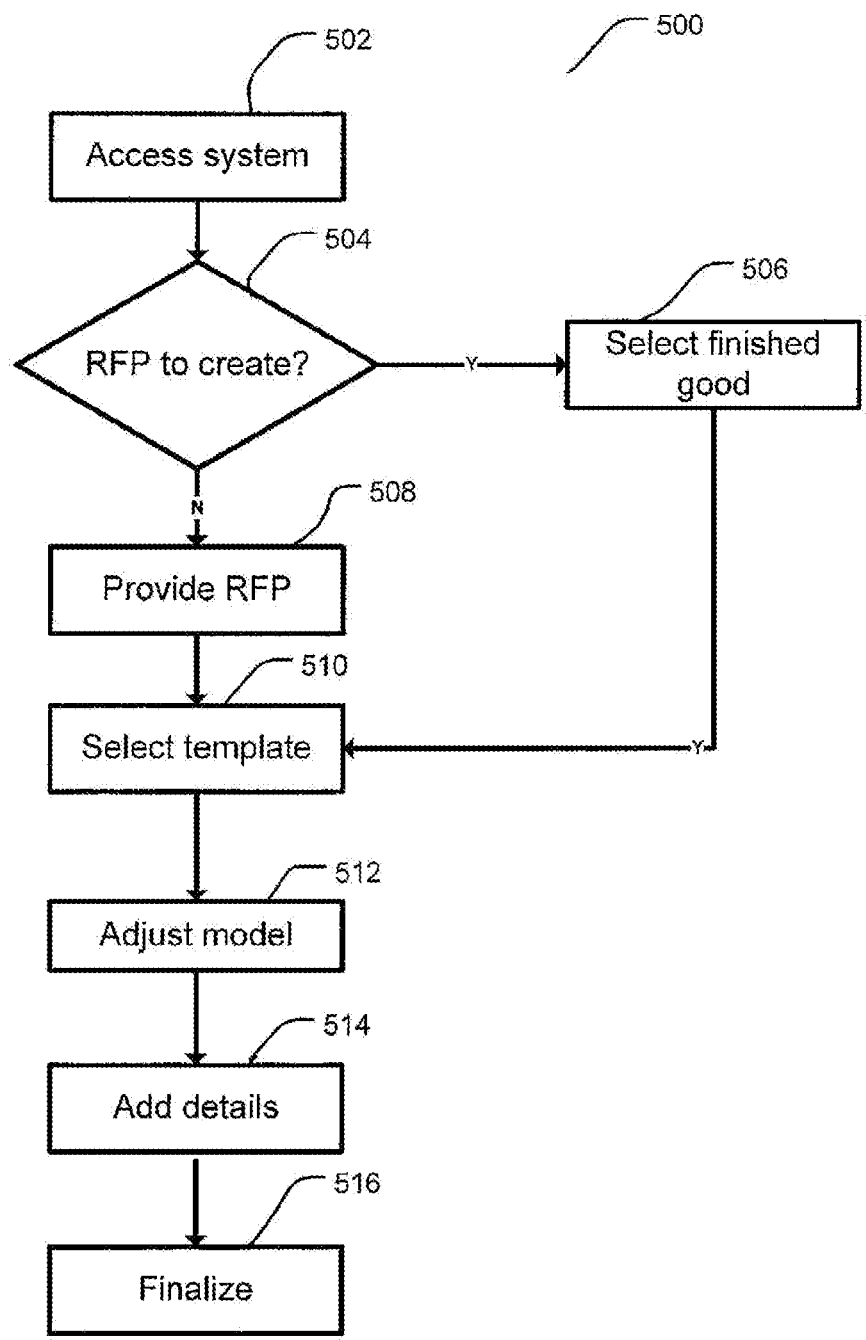
FIG. 5 is a flow chart of an embodiment of a method for creating a RFP or RFPR according to the invention.

FIG. 5 is a flow chart of process 500 for creating a RFP or RFPR. Process 500 may be used with process 400, for example at 402 or 408. Process 500 allows a RFP or RFPR to be created, optionally through the use of one or more templates such as old scenarios, RFPs, RFPRs or through converting a scenario to a production line. Process 500 may be performed through the use of a system provider, such as system provider 18 and assembler module 22a and customer module 22c. Process 500 may be implemented by system provider, for example, via one or more user screens.

Portions of process 500 may be implemented, for example, via user screens 1102 in FIGS. 11A-E.

Process 500 begins at 502 by accessing system provider. This may occur, for example, by providing a user ID and logging. The user may use RFP creation terminal 14a or RFPR terminal 108.

Process 500 continues at 504 where a query is made whether a RFP or RFPR is to be created. Such a query may be answered simply through system provider 18 knowing what user logged in. In one embodiment, system provider 18 may know that a given user is a customer, such as customer 14 and will thus be creating a RFP.

If a RFP is to be created then process 500 continues at 506 to allow selection of a finished good to create a RFP for. This may be accomplished, for example, by providing a list for a user to select from, or letting a user define a new one.

If a RFP is not to be created, but rather a RFPR is to be created, then process 500 continues at 508 where the RFP to be responded to is provided. This may determine, for example, what finished good the RFPR will relate to.

After either 506 or 508, process 500 continues at 510 where a template may be selected. Templates may be presented in lists, may be selected automatically based on 506 or 508, or all templates may be presented. At 510 system provider 18 may know whether the templates should be RFPs or RFPRs. In such a case only the appropriate templates will be offered. Templates may be old RFPs, old RFPRs, or portions thereof. Templates may be matched to a user of system provider such that only templates that a user has previously used are presented. Other filters may also be applied to tailor the list of templates to the user. When a template is selected, process 500 continues to 512. It is to be understood that while advantageous for efficiency, it is not required that a template is selected at 510. If no template is appropriate, desired, or available, process may still proceed to 512 where details about the RFP or RFPR may be manually added. This may involve beginning from a blank screen or generic RPF or RFPR template screen.

At 512 the selected template is modified for the current RFP or RFPR. Modification at 512 may be substantial changes, for example to equipment or labour. Additionally, changes may be minor in nature, such as adjustments to costs or the number of required finished goods. At 512 however, any modifications to existing aspects of the template may be modified as required.

Process 500 then continues at 514 where details may be added to the RFP or RFPR. In contrast to 512, at 514 details may be added that were previously omitted. By way of example, if a further sub-component is required it may be added at 514.

It is to be understood that 512 and 514 may occur at the same time and may have significant overlap. They may simply provide an opportunity to arrive at a final RFP or RFPR.

At 516 the newly created and adjusted RFP or RFPR are finalized. Submission may be an indication that the RFP or RFPR are completed and ready to be distributed. Alternatively, finalizing may simply indicate that they can be saved, although it is to be understood that at any point in process 500 the RFP or RFPR may be saved, to be finalized at a later time.

Creating a Production Line

Figure 6:
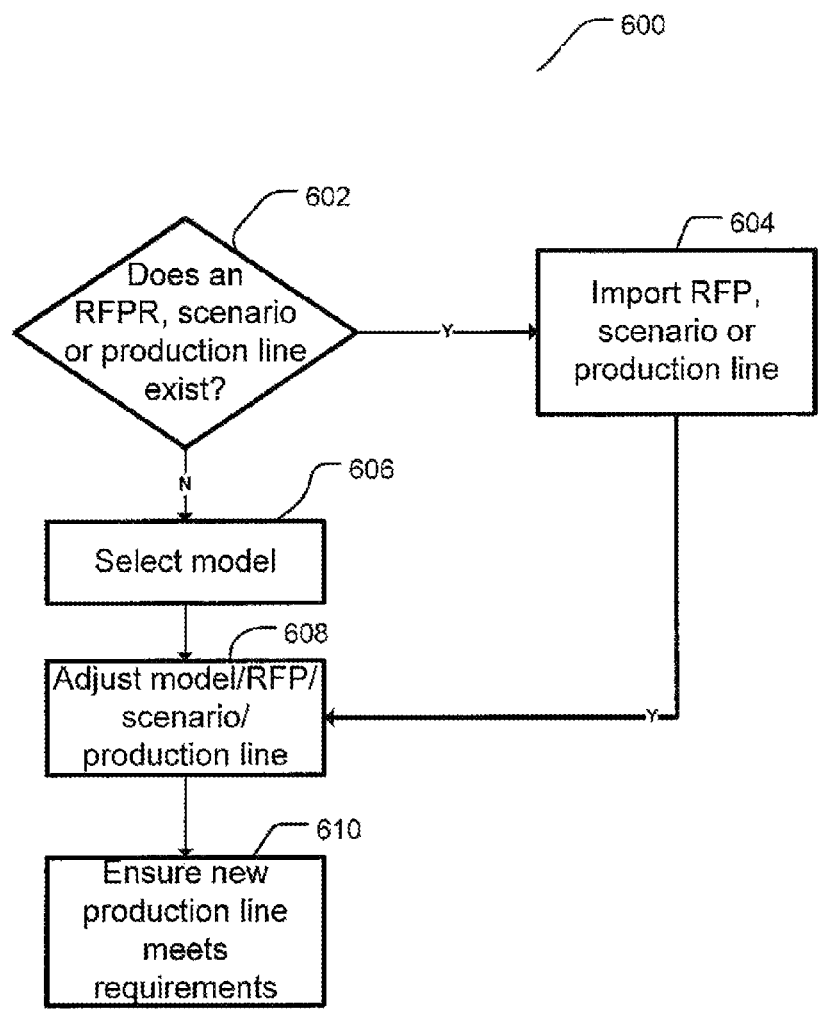
FIG. 6 is a flow chart of an embodiment of a method for creating a production line according to the invention.

FIG. 6 is a flow chart of process 600 for creating a production line, optionally from pre-existing information. Process 600 may be used for example by contractor 12 when their RFPR has been accepted and they wish to set up and implement an actual production line. This process can be time-consuming if no pre-existing information is available. Process 600 may also assist in conforming the production line with the scenario or RFPR that was submitted to secure the contract. This allows the production line to be compared to the RFPR to track actual performance to the estimates established in the RFPR. Further, a new job, project or production line may be created based on an already existing production line, and may allow a user to resolve any conflicts between new and existing attributes of a production line.

Process 600 may be performed through the use of a system provider, such as system provider 18 and assembler module 22a (such as via inventory management module 124) and customer module 22c (such as via monitoring module 52). Process 600 may be implemented by system provider, for example, via one or more user screens 1102.

At 602, process 600 queries whether a RFPR, scenario or production line exists. A RFPR or scenario may often exist as they may normally be required in response to a RFP. In such case, process 600 continues to 604. However, a RFPR or scenario may not exist. This may occur, for example, if a bidding process is not entered into (such may occur if customer 14 and contractor 12 decide they wish to work together without a bidding process) or if a requirement change is leading to the new production line. If no RFPR or scenario exists then process 600 continues at 606.

Continuing at 604, the RFPR or scenario may be imported to create the new project or one or more production lines. This may be accomplished by, for example, production module 120. Importing may involve copying some or all of the data from the RFPR or scenario into a production line. This may require obtaining data, for example from data stores 24, and placing it in a new data element. This new data element, which may be a production line data element (that is configured to store all information relevant for a production line) may be saved in data stores 24—upon importing, later in process 600 or after process 600 is complete.

Process 600, at 604 may be one area where customer module 22c and assembler module 22a interact and may create efficiencies. It may further be an area where RFP creation, RFPR creation and production line creation interact and may create efficiencies.

In particular with respect to 604, importing may occur, for example, via direct integration, web API integration, or file integration.

Direct integration may be where a RFPR can take the form of an estimate object within assembler module 22a. Such estimate object may be used to create a production line object, or may substantially be a production line object, which can be used by assembler module 22a for a production line. Through either customer module 22c or assembler module 22a customer 14 or contractor 12 can view estimates (RFPRs) that have been directly created in assembler module 22a. This may provide the tightest integration because the RFPR is supported by the same information as a estimate. The availability of RFPR data such as pricing scenarios and volume information facilitates the transition from an RFP "win" to the initiation of production towards the winning bid.

Web API integration may allow the RFPR to take the form of an RFPR object within customer module 22c and allow viewing RFPRs within customer module 22c or assembler module 22a and at such time that production is initiated, the winning RFPR can be pushed or pulled between customer module 22c or assembler module 22a. This push/pull may use the web-based API that employs representational state transfer to communicate between assembler module 22a and any other connections, such as client connections.

File integration may allow the RFPR to be exported from customer module 22c or assembler module 22a to a file (such as XML or .csv formats) and subsequently imported into assembler module 22a through the estimate import action.

At 606, if no RFPR or scenario exists then a template may be selected. This may be substantially similar to selecting a template at 510.

After either 604 or 606, process 600 continues at 608 to adjust the imported RFPR or template. The adjustments may be substantially similar to those described with respect to 512 and 514.

At 610, process 600 ensures that the new production line meets requirements. The requirements may be specified in a RFP or may have been communicated in another fashion. The requirements may be substantially any requirements discussed herein. Ensuring the requirements are met may involve first comparing the production line to the requirements and then may involve adjusting the production line and/or the required resources, for example using a Gantt chart, as described herein. Ensuring requirements are met at 610 may be more relevant if no RFPR or scenario exists at 602 as production requirements would likely have been met by either of these. However, requirements, resources or other aspects of the process may have changed between the RFPR and production line times which may be a few of the reasons that may cause 610 to be required.

Capacity Planning and Ensuring Requirements are being Met

Figure 7:
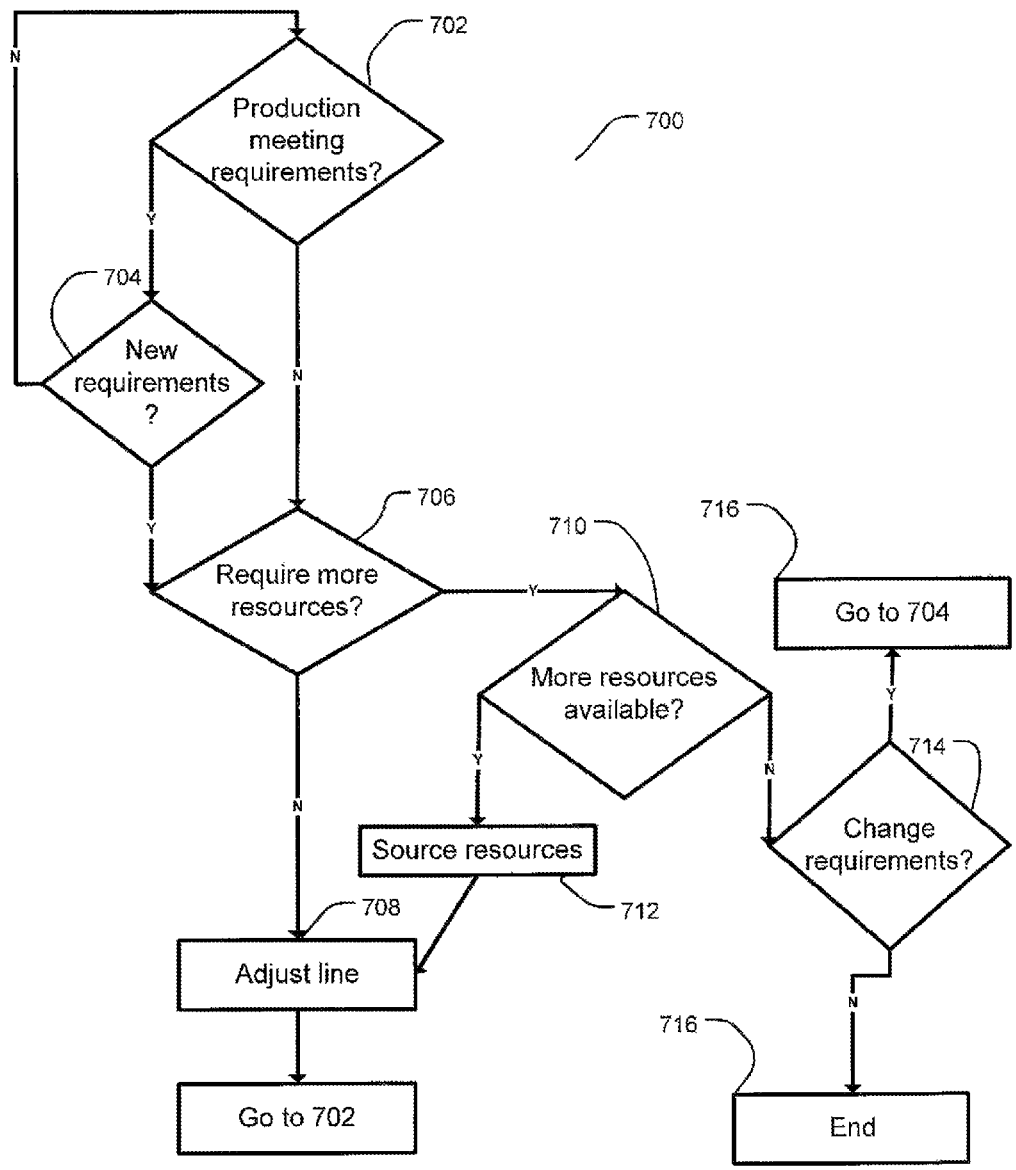
FIG. 7 is a flow chart of an embodiment of a method for ensuring requirements are met according to the invention.

FIG. 7 is a flow chart of process 700 for ensuring requirements such as production volumes are met. Process 700 may be used for example by contractor 12 when their RFPR has been accepted, they have set up and implemented a production line, and want to make sure it meets requirements such as production volumes. Alternatively, process 700 may be used by contractor 12 when preparing their RFPR to ensure that the RFP requirements are met and should allow an appropriate production line to be implemented (such as one that meets production volumes).

Process 700 may be performed through the use of a system provider, such as system provider 18 and assembler module 22a (such as via inventory management module 124) and customer module 22c (such as via monitoring module 52). Process 700 may be implemented by system provider, for example, via one or more user screens, including user screens with Gantt charts, calendars, or tables, as described herein.

Process 700 may be initiated at a pre-determined frequency such as once an hour or once a day. Process 700 may also be initiated by one or more users such as contractor 12 or customer 14, or may be initiated in response to one or more changes to the production line or its environment (such as resource scarcity, rejects, quality issues such as finished goods not meeting quality standards, low productivity such as by particular operators or employees, or machine downtime).

Process 700 begins at 702 to query whether production is meeting requirements. This may be determined, for example, by comparing one or more requirements to the progress of the production line. This may be done, for example, by production module 120 of system provider 18.

If the requirements are being met then process 700 continues at 704 where a query is made whether there are any new requirements. New requirements may be specified by, for example customer 14 or contractor 12 and may include such things as increased volumes, lower costs, a new shipping address, or a new sub-component for the finished good. Such requirements may be specified for example via production terminal 108 and production module 120 or via monitoring module 52 and one or both of monitoring terminal 14b or production terminal 108. If there are no new requirements at 704 then process returns to 702. If there are new requirements, then process 700 continues to 706. In one exemplary embodiment, customer 14 may require more finished goods. A request for more finished goods may directly cause the creation of a further project or job for contractor 12, for example in production module 120. The customer's ability to create new projects automatically may be allowed or denied and it may depend, for example, on the nature of the relationship between contractor 12 and customer 14, and may be specified in, for example, production module 120.

Returning to 702, if the requirements are not being met then process 700 continues to 706, as will be described herein.

At 706 a query is made whether more, less or different resources are required to meet the new requirements. Different resources may include, but are not limited to, new sub-components, new steps in the production that will require machinery not currently available, altering production line layouts or sequencing, and a skilled worker not currently available.

If no new resources are required at 706 then process 700 continues at 708 where the production line is adjusted to meet the new requirements. Adjustments at 708 may include any changes that do not require new resources. Exemplary changes may include increasing a machine's speed, adding more workers, extending a shift, or ordering more sub-components more quickly.

Returning to 706, if more resources are required then at 710 a query is made whether they are available. Certain resources may not be available, for example commodities may be scarce, a warehouse may not have enough room to expand the production line, or there may not be enough skilled workers. If they are not available then process 700 continues to 714 to revisit the requirements and determine whether they can be altered. If the requirements can be altered then the requirements are altered and process 700 then returns to 704. If they cannot be altered then process 700 terminates at 716. Process 700 may restart at 702 if any initiating events occur.

If at 710 the resources are available then process continues at 712. Examples of the resources being available may include being able to order more sub-components, hiring more workers, adding a night shift, or adding another machine. At 712 the resources are sourced—purchased, hired, leased or whatever is required.

Process 700 then continues at 708 where the production line is adjusted to meet the new requirements, as described herein.

In a further embodiment, process 700 may occur, or be partially performed, by an customer's 14 customer. This may be, for example, a retailer, wholesaler or consumer (together referred to as end consumer) of customer's 14 finished good. In such an embodiment, contractor 12 may allow the end consumer to create a new requirement at 704. This may be similar to how customer 14 may create a new requirement. This may create a new project or job for contractor 12 that is destined directly for end consumer (so that the shipping address, for example, may be that of the end consumer). Each end consumer may desire slight differences in the finished goods. Although such differences may add complexity (as generally production lines are intended to produce uniform finished goods) this may be accomplished, and may allow a "do it yourself" approach for a customer's 14 end consumer. Because tracking, in system 800, can occur at any level and transaction data may be captured (allowing contractor 12 to know where exactly the slightly different wrapping paper that an end consumer may want, for example) warehouse system 800 can ensure that the right customizations end up in the right finished goods destined for the end consumer.

Warehouse System for Transaction Data

Figure 8:
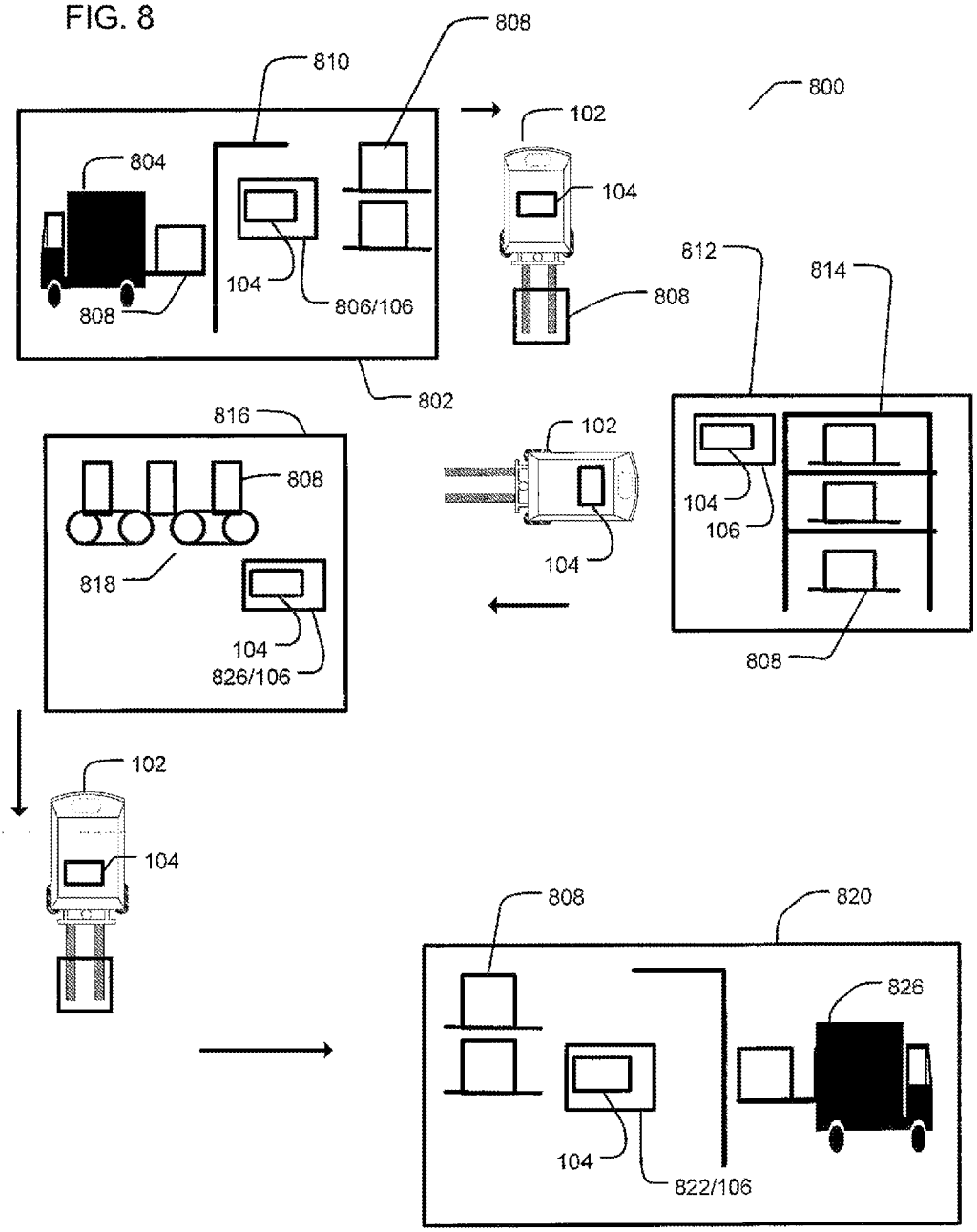
FIG. 8 is a diagram of an embodiment of a warehouse system according to the invention.

FIG. 8 is a diagram of an embodiment of a warehouse system 800 according to the invention. System 800 comprises receiving system 802 further comprising one or more providers 804, receiving locations 810, receiving terminals 806/106, and inventory 808, one or more machine terminals 102 further comprising peripheral 104, inventory storage locations 812 further comprising warehouse terminal 106 further comprising peripheral 104 and warehouse locations 814, work in progress (WIP) 816 further comprising production lines 818 further comprising one or more production line equipment 110 and WIP terminals 826/106 and shipping system 820 further comprising shipping terminals 822/106, shipping locations 824, and shippers 826.

System 800 is an assembly warehouse system that may allow collection and maintenance of transaction data, and allow clean data (which may provide benefits for continual process improvement and lean manufacturing, as described herein) to be kept for the inventory of sub-components and finished goods in a warehouse. System 800 may have one or more receiving systems, inventory storage locations 812, WIP 816, and shipping systems 820. It may be desirable for each movement of inventory 808 (which may be sub-components or finished goods) to be tracked; in such case it may be desirable to have at least one of receiving systems, inventory storage locations 812, WIP 816, and shipping systems 820 at any location in a warehouse that sub-components or finished goods may be. In that way, whenever sub-components or finished goods leave a location or arrive at a location that can be captured and tracked—resulting in more transaction data (and its associated benefits as described herein) and cleaner data.

System 800 may receive at least some of the collected transaction data by manual methods, such as by workers writing down transaction data, and later entering this transaction data into a terminal such as warehouse terminal 106. This may be used, for example, to replace some more automated aspects of system 800, may be used for back up purposes, or if system 800 would otherwise be difficult or expensive to operate. Further, system 800 may be used at some contractors 12 and not others, and even at some but not all warehouses belonging to an contractor 12.

System 800 may also respond to moves (of inventory 808 such as sub-components or finished goods) requested or initiated by a user, as described herein and in particular with respect to process 900. In responding, system 800 may collect transaction data, which may be confirmation transaction data, substantially as described herein.

Although it may be desirable for all warehouses, for all contractors 12 to implements the entirety of system 800, it is to be understood that portions of system 800, for at least one warehouse, may be implemented and still operate to collect and maintain transaction data.

System 800 may provide data, such as transaction data as described herein, as one or more warehouse inputs, to system provider 18 and in particular assembler module 22*a* and customer module 22*c* for storage in data stores 24. Such data may be used in implementing one or more of the processes described herein, and may be displayed in one or more user screens 1102 as described herein. Alternatively, other systems, such as available WMS systems, may provide data, alone or in combination with system 800. System provider 18 and its modules and data stores 24 may be configured to receive such data from WMS systems, where such data may be different than transaction data from system 800 and may, for example, not be transaction data but rather static "snapshot" or "count" data that does not capture the flow of sub-components and other aspects. In one exemplary embodiment, another WMS system may provide data in EDI format, allow system provider 18 to receive the data in a known format and store and use the data to achieve one or more desired results of system provider 18 for customer 14 and contractor 12. In such an embodiment, system 800 may substantially be like a plug-in for system provider 18 to receive data. This approach may allow aspects of system provider 18 to be achieved separately from implementing system 800 in a warehouse.

It is to be understood that other aspects of system provider 18 (as described herein) or other systems may be implemented substantially like a plug-in, the same plug-in or one or more further plug-ins. Such plug-ins may require configuration of system provider 18 or may be configured to communicate with system provider 18 without requiring further configuration of system provider 18.

By way of example, system provider 18 may further comprise an advertising module (not shown) or be configured to communicate with an advertising plug-in. An advertising module may allow advertising on one or more user screens 1102. Such advertising may be directed at substantially any aspect of system provider 18, customer 14 and contractor 12. For example, advertising may be for contractors 12 and may be presented to one or more customers during creation of an RFP. As a further example, advertising may relate to one or more items in a library on data stores 24 such as providers of sub-components when customers 14 or contractors 12 are creating RFPs or RFPRs, or are ordering sub-components.

As a further example, system provider 18 further comprise a market data mining and reporting module (not shown) or be configured to communicate with a market data mining and reporting module. Such market data module may perform data mining across markets such as sub-components, finished goods, customers 14, contractors 12 and may be used to study production speeds, how accurate RFPRs were compared to actual production, reject numbers, labor costs and other aspects of a market. Such market data module may, for example, be able to access at least a subset of transaction data, libraries and other data on data stores 24, as described herein. Data that may be accessed may be altered to remove customer 14 or contractor 12 identifying information and confidential information. As a further example, transaction data (raw or in report format) may be provided via market data module.

Receiving terminal 806/106, WIP terminals 826/106 and shipping terminals 822/106 may be substantially the same as warehouse terminal 106, as described herein. These terminals may all be configured to capture transaction data relating to arrivals and departures of inventory 808 (and/or constituent pallets, cases, units and 'eaches') to the locations in the warehouse the terminals are at. Receiving terminals 806/106, WIP terminals 826/106 and shipping terminals 822/106, machine terminals 102 and warehouse terminals 106 may require human intervention to capture transaction data (such as to operate peripheral 104 which may be a scanner) or may occur automatically (such as through RFID). Any required human intervention may be provided by an employee at the warehouse, such as a receiver, production line worker, machine operator, or shipping employee.

Machine terminals and peripherals 104 may be substantially as described herein.

Assembly warehouse system may be located at contractor 12. In one embodiment of a use of system 800 provider 804 may bring in receiving inventory 808 and deliver it to receiving location 810 at contractor 12. Receiving terminal 806/106 may capture transaction data related to receiving inventory 808. Machine terminal 102 may then pick up receiving inventory 808, capturing transaction data related to picking up inventory 808. Machine terminal 102 may then drop off inventory 808 at inventory storage location 812, capturing transaction data related to dropping off inventory 808. Warehouse terminal 106 may capture transaction data related to receiving inventory 808. Machine terminal 102 may then pick up inventory 808 from warehouse location 814, capturing transaction data related to picking up inventory 808. Machine terminal 102 may then drop off inventory 808 at WIP 916, capturing transaction data related to dropping off inventory 808. WIP terminal 826/106 may capture transaction data related to receiving inventory 808. Production line equipment 110 at WIP 816 may then capture transaction data relating to inventory 808 (and any included sub-components) as it is assembled into finished goods. Machine terminal 102 may then pick up inventory 808 (now in the form of finished goods) from WIP 816, capturing transaction data related to picking up inventory 808. Machine terminal 102 may then drop off inventory 808 at shipping systems 820, capturing transaction data related to dropping off inventory 808. Shipping terminal 822 may then capture transaction data relating to inventory 808 being provided to shippers 826 and leaving the warehouse.

Receiving system 802 may introduce inventory 808 to a warehouse.

Providers 804 may be external providers of inventory 808 such as customer 14 or a third party customer of contractor 12. Providers 804 may be from a different company from contractor 12 (whose warehouse inventory 808 may be being delivered to) or may be the same entity, such as where inventory 808 may simply arrive from another contractor 12 building or location. Providers 804 may use trucks, delivery people, trains or any other way to delivery inventory 808. Inventory 808 may be providers' 804 own or provider 804 may simply be delivering it.

Inventory 808 may be organized in various forms and at various levels of granularity such as pallet level, cases, and unite 'eaches'. In one embodiment, inventory 808 may arrive in pallets made up of cases, and 'eaches' of one or more sub-components required for a finished good. One or more levels of granularity may have its own unique identifier that can be used for capturing transaction data and for tracking. Regardless of whether a particular level of granularity has a unique identifier, inventory 808 may be able to be tracked and transaction data captured. Further, one or more pallets of inventory 808 may have its own unique identifier while one or more pallets of inventory 808 may not. System 800 is able to track inventory 808 and each pallet in any case.

Inventory 808 can be substantially any level of detail for sub-components and other materials or consumables going into a finished good. For each sub-component, materials or consumable there may a setting in system 800 to track or not track their movement (essentially turning transaction data capturing "off" for that item). This setting may be turned off, for example, for generic items such as glue, gloves, hairnets, tape and the like. This allows these items to not need to be moved into production line 818 to be consumed into a finished good. They may be consumed from wherever they exist in inventory. This may preserve inventory accuracy while saving users the step of having to move these items, or capture transaction data related thereto.

Receiving system 802 further comprises one or more receiving locations 810 that may each have one or more receiving terminals 806/106. Receiving locations 810 may be where inventory 808 is dropped off at system 800 and may essentially be a physical location within a warehouse. Each receiving location 10 may be operated by an employee, such as a receiver. Receiving terminals 806/106 may be substantially similar to warehouse terminal 106 and may be located at a receiving location to capture transaction data related to receiving inventory 808 from provider 804. Receiving terminals 806/106 may also capture data, which may be included in transaction data, relating to damage or issues with the received inventory 808, such as images or metadata captured at the time of receiving inventory 808. Receiving terminals 806/106 may require human intervention to capture transaction data (such as to operate peripheral 104 which may be a scanner) or may occur automatically (such as through RFID).

Inventory storage locations 812 may be the systems where inventory 808 is stored before being moved to WIP for assembly. Inventory 808 may be at one or more inventory storage locations 812 prior to moving to WIP, though it may be preferable not to move between inventory storage locations 812, such as for efficiency purposes. Inventory 808 may be stored in different levels of granularity than it arrives at. By way of example, inventory 808 may arrive as a pallet with one or more cases of two different sub-components. Each case may stored at separate inventory storage locations, and tracked separately. The original relationship to the pallet may be maintained (such as if the pallet had a unique ID) but more granular tracking may also occur. Inventory storage locations 812 may be operated by an employee or a group of employees for one or more inventory storage locations. Alternatively, operators of machine terminals 102 may perform substantially the role of inventory storage location 812 operators.

Inventory storage locations 812 further comprise warehouse terminal 106 further comprising peripheral 104 and warehouse locations 814. Warehouse locations 814 may store inventory 808 and may consist of shelving or other storage systems.

WIP 816 may be the area where one or more sub-components are made into finished goods. WIP 816 further comprises one or more production lines 818 further comprising one or more production line equipment 110 and WIP terminals 826/106. WIP 816 may be treated by system 800 substantially as inventory storage locations 812. Inventory 808 may be moved to WIP 816 and transaction data captured relating to the move. Inventory, when in WIP 816, may be treated substantially as when inventory 808 is in inventory storage locations 812 and may be tracked, substantially in real-time, just like being in inventory storage locations 812.

One or more quality checks may be performed at WIP 816. Such quality checks may be specified by customer 14 (such as in a RFP) or contractor 12 (such as in a RFPR). Such quality checks may be imported into a project or job and may be associated with a finished good. These quality checks may be performed by people or machines on a production line and transaction data related to passing or failing may be captured such as on WIP terminal 826/106 or by production line equipment 110. Although people may also perform quality checks and provide sign-offs manually, they may use a terminal as described herein and such sign-offs on a terminal may be by entering a password used to record approvals and authorization in these Quality Checks. Quality checks may be done on intervals and system 800 may provide notification of when quality checks should occur. Alerts or notifications, as described herein, may be triggered upon failure.

One or more production 818 lines may be a collection of production line equipment 110 used to assemble sub-components into finished goods. Production lines 818 may further comprise one or more employees (not shown) and production line equipment may be operated by a further, or the same, one or more employees. Alternatively, production lines 818 and production line equipment 110 may be fully automatic.

Shipping system 820 may be where inventory 808 (in the form of finished goods) leaves a warehouse.

Shipping system 820 may further comprise shipping terminals 822/106, shipping locations 824, and shippers 826. Shipping locations 824 may be where finished goods are dropped off at system 800 after being made and may essentially be a physical location within a warehouse. Each shipping locations 824 may be operated by an employee, such as a shipping employee. Shipping terminals 822/106 may be substantially similar to warehouse terminal 106 and may be located at a shipping location 824 to capture transaction data related to providing inventory 808 (in the form of finished goods) to shipper 826.

Shippers 826 may be external recipients of inventory 808. Shippers 826 may be from a different company from contractor 12 (whose warehouse inventory 808 may be being delivered to) or may be the same entity. Shippers 826 may use trucks, delivery people, trains or any other way to pick up inventory 808.

Collection of Transaction Data

Figure 9:
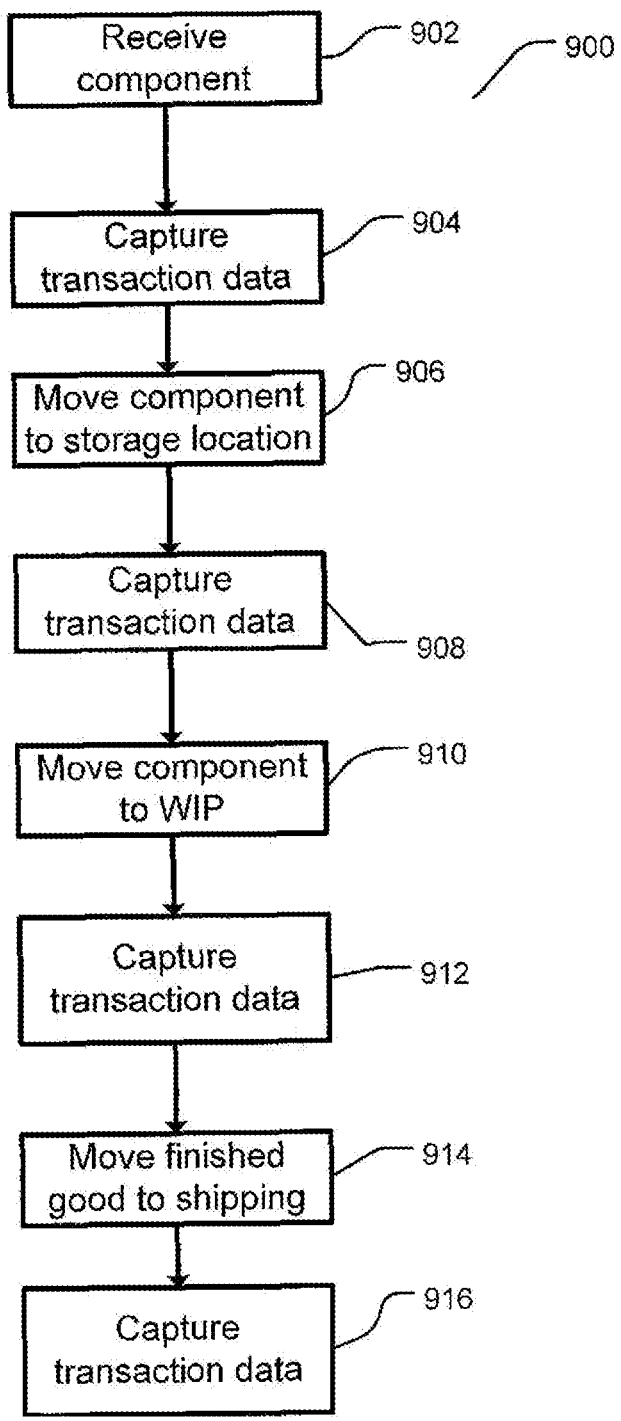
FIG. 9 is a flow chart of an embodiment of a method for transaction data according to the invention.

FIG. 9 is a flow chart of process 900 for obtaining transaction data for a warehouse. As discussed herein, obtaining transaction data has many advantages. The more transaction data that can be obtained, the cleaner the data for analyzing the warehouse. Obtaining transaction data can be difficult for a warehouse, such as if all transaction data must be manually entered. It may therefore be advantageous for some transaction data to be entered automatically and for some transaction data to be associated with transaction data that was captured manually or automatically, for example by system provider 18.

Process 900 begins at 902 with receipt of inventory 808 which may be a pallet of sub-components.

Process 900 continues at 904 where transaction data is captured relating to the receipt. This may occur, for example by receiving terminal 806/106. Capturing transaction data, at any of 904, 908, 912 and 916 may be manually performed by an employee at that location (such as a shipper, receiver, production line employee or warehouse employee). This may be done, for example, using a peripheral 104 such as a barcode scanner to scan inventory 808 and/or by typing information into a nearby terminal. Alternatively capturing may be automated, such as by wireless communications such as RFID, 802.11 WiFi or Bluetooth.

Captured transaction data may comprise one or more identifiers of inventory 808, one or more location identifiers, time information, one or more employee identifiers and any information associated with these. Exemplary associated information may include a scenario inventory 808 relates to, a supplier, a finished good to be made from inventory 808. Such associated information may be associated by, for example, inventory management module 124.

At 906, inventory 808 may be moved to a storage location such as inventory storage location 912. Such moving may be done by, for example, machine terminal 102 and may be done according to an algorithm, such as a slotting algorithm, which may make storage more efficient (such as minimizing distances sub-components need to be moved, placing less frequently accessed sub-components on higher shelves, etc). Although not shown in FIG. 10, inventory 808 may be divided and moved to separate inventory storage locations 812 or may be moved, in whole or in parts, to different inventory storage locations 812. It may be desirable to only have any portion of inventory 808 at one inventory storage location 812, for example for efficiency.

At 908 transaction data is captured relating to the move. Such capturing may relate to removing inventory 808 from its current location or placing it in the next location, or both. Such capturing may occur, for example, by one or more of machine terminal 102, receiving terminal 806/106, or warehouse terminal 106.

Although moves, at 906 and 908 are described as being initiated from moving physical inventory 808, it is to be understood that moves may be initiated through one or more of assembler module 22a or customer module 22c such as via warehouse terminal 106, RFP response terminal 108, production terminal 112 or monitoring terminal 14b. This may involve, for example, a user selecting one or more pieces of one or more sub-components or finished goods to be moved.

User initiated moves initiated virtually before physically may be implemented similar to a shopping cart on an ecommerce site. A user may first search for and select one or more inventory items (virtual items, such as via one or more user screens on one or more terminals such as production terminal 112 or monitoring terminal 14b), in one or more locations in a warehouse. This may be possible from having stored transactional data related to the inventory items. Searching, or filtering, of inventory items may be based on various attributes of the inventory (such as a name, price, size, arrival data etc). The user may also specify a quantity of such inventory items to move. This quantity of inventory 808 may be added to a "cart". This may be repeated one or more times. A user may then specify where inventory 808 (such as sub-components or finished goods) should be moved to (such as inventory storage location 812, WIP system 816 or shipping system 820). When the "cart" is full (such as if the user has specified all of their desired moves) then the moves can be virtually initiated—with physical moves of inventory 808 resulting. It is to be understood that the above user initiated moves may be effected via one or more user screens (not shown, but that may be similar to those shown in FIGS. 11-13. One or more modules may assist in such user initiated moves. By way of example, when a user selects a sub-component that needs to be moved, production module 120 may automatically select or suggest which particular units should be moved. This may be based on, for example, inventory concepts such as Last In First Out (LIFO) or First In First Out (FIFO). Such particular units may be automatically added to the cart by such module.

Entering such move information, and initiating them, may cause such movement of physical inventory 808. This may be via sending one or more notifications to one or more warehouse terminals 106 or machine terminals 102.

Process 900 continues at 910 where inventory 808 may be moved from a storage location to WIP, for example WIP system 816. Such moving may be done by, for example, machine terminal 102.

At 912 transaction data is captured relating to the move. Such capturing may relate to removing inventory 808 from its current location or placing it in the next location, or both. Such capturing may occur, for example, by one or more of machine terminal 102, warehouse terminal 106 or WIP terminal 826/106.

At 912, a process known as conversion may occur. Conversion is a process where subcomponents are converted into finished goods in accordance with a prescribed bill of materials (which may be part of the assembly steps, an RPF or RFPR, for example). The bill of materials may describe the individual conversion rates. For example "the production of 1 unit of finished good X requires 3 units of subcomponent P and 2 units of subcomponent Q". From a transactional perspective, there may be two transactions. The first phase may be subcomponent consumption which deducts subcomponent inventory. Building on the previous example, if 10 units of finished good X are produced, then negative 30 units of subcomponent P and negative 20 units of subcomponent Q would be represented in two separate transactions. The second phase may be called finished good production which would increase finished good inventory. Since 10 units of a finished good X are introduced, positive 10 units of finished good X may be represented in a single transaction.

It may be important, as described herein, to determine which exact sub-components went into specific finished goods. However, maintaining accurate and useful transaction data through the conversion process may be difficult. This may be because of the speed of the production line, for example. Despite such difficulties, it is desirable to maintain accuracy and various 'backflushing' approaches (to ensure accurate data in conversion) may be employed.

For BAS level, backflushing, one or more users may record lot codes for sub-components going into specific pallets of finished goods. This may be done manually of using system 800. BAS backflushing (or backflushing at the pallet level)

may be employed when the production line is moving more slowly—allowing users to check such information as it is assembled into pallets.

Reconciliation level backflushing may be performed after a job (producing several pallets of finished goods) is complete. This may involve determining the lot codes of all the sub-components that went into the finished goods in that job. This would not allow tracking at the pallet level for sub-component lot codes, but at the job level. This may be used when a production line is moving too quickly and pallets are being organized and moved out of WIP (and/or the shipping) more quickly. By way of example, 100 pallets may be part of a job that was loaded on a truck and shipped out. Lot codes 1-1000 or sub-component A may be known to be in one of those 100 pallets. This may then be entered and checked after conversion so that job level tracking is accomplished.

Process 900 continues at 914 where inventory 808 (which now may be in the form of finished goods and waste sub-components) may be moved from WIP to a shipping area such as shipping system 820. Such moving may be done by, for example, machine terminal 102 or by hand.

At 916 transaction data is captured relating to the move and operation of one or more production lines in WIP system 816. Capturing may relate to removing inventory 808 from WIP or placing it in shipping area, or both. Capturing may further involve other production data such as how many of each sub-component was wasted. Such capturing may occur, for example, by one or more of machine terminal 102, WIP terminal 826/106 or shipping terminal 822/106. Transaction data at 916 may involve determining how many of each sub-component went into each finished good.

It is to be understood that although not shown in FIG. 9, inventory 808 and/or any sub-components, may be returned from WIP to inventory storage location and from inventory storage location to receiving. This may occur, for example, if there are defects, items to return, unused items, or for various other reasons. If any of this occurred, transaction data related to these moves may also be captured.

Production/Requirements Monitoring

Figure 10:
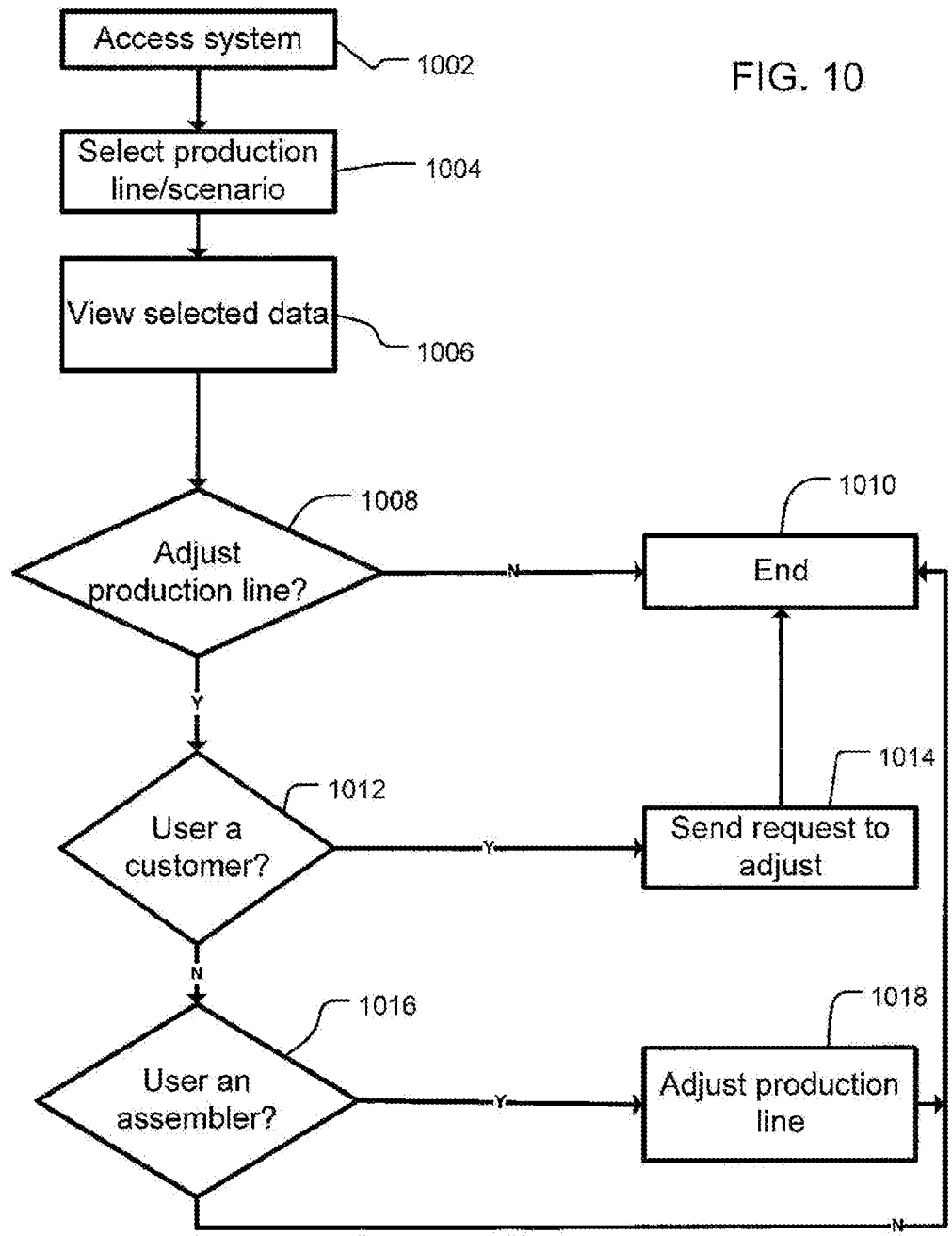
FIG. 10 is a flow chart of an embodiment of a method for monitoring a production line according to the invention.

FIG. 10 is a flow chart of process 1000 for monitoring a production line for a warehouse.

Process 1000 may be performed through the use of a system provider, such as system provider 18 and assembler module 22a (such as via inventory management module 124, monitoring module 52 or production module 120) and customer module 22c (such as via monitoring module 52). Process 700 may be implemented by system provider, for example, via one or more user screens, including user screens with Gantt charts, calendars, or tables, as described herein.

Process 1000 begins at 1002 by accessing a system. This may be substantially similar to 502 of process 500.

At 1004 a production line to monitor is selected. Each person accessing may have the ability to monitor different production lines and their related jobs, for example based on their user IDs and access levels. At 1004 they may select from among those production lines.

At 1006 the selected production line or job, and its data, is viewed. This may be via one or more user screens provided by monitoring module 52. An exemplary screen may be seen in FIG. 13. By selecting various user interface components, a user may view different real-time or historical data relating to the production line, including any of the transaction data that has been captured from the production line. This may be accomplished by accessing transaction data from data stores 24 via production module 120, monitoring module 52 and inventory management module 124. Data that may be viewed may include the number of finished goods produced, sub-components' arrival schedule, costs, the number of wasted sub-components, labor costs, and employee production rates.

At 1008 a query is made whether to adjust the production line. This may be in response to any of the data viewed at 1006. Adjustments may be desired for example if the number of finished goods is too low (which may lead to scheduling a new job or increasing the number of finished goods a job will create), the number of wasted sub-components is too high or sub-components are not scheduled to arrive quickly enough. If the user is a customer, such as customer 14, they may want to adjust the production line or job as a result of a new requirement for greater numbers of finished goods, such as if sales are greater than anticipated. If the user is an assembler, such as contractor 12, they may want to adjust the production line by increasing the skill or number of the employees, change production line equipment 110 for example to reduce waste, or various other reasons.

If no adjustment is desired, then process 1000 terminates at 1010.

It is to be understood that making adjustments to a production line may be different for different users. For example, a customer may not be able to directly alter an assembler's production line, whereas an assembler could. This may be a reason that process 1000 continues to 1012 if an adjustment is desired.

At 1012 a query is made whether the user is a customer such as customer 14. If so, process 1000 continues at 1014. At 1014 a request to adjust the production line may be sent. The request may be a specific request such as to change production line equipment 110 or remove/add an employee. Alternatively, the request may be a changed requirement such as to increase the number of finished goods (again, which may lead to scheduling a new job or increasing the number of finished goods a job will create), or change when the finished goods will be produced. Sending the request may be via system provider 18 and in particular monitoring module 52 and/or production module 120. Having sent the request at 1014, process 1000 terminates at 1010.

If at 1012 the user is not a customer then process 1000 continues at 1016 to query whether the user is an assembler. If not, process 1000 terminates at 1010 as only contractors 12 and customers 14 may be able to adjust a production line. Alternately, process 1000 may prevent other users from accessing the system at 1002. If the user is an assembler then process 1000 continues at 1018.

At 1018 an adjustment can be made to the production line. This may include any adjustment or requirement changing as described herein. Contractor 12 may want to increase production by adding a further shift. They may want to reduce production as commodity or sub-component prices have risen and they are not in a rush to make finished goods. Alternatively they may have received a request to adjust the production line from customer 14 (via system provider 18 and production module 120 or having spoken to customer 14). After adjusting the production line, process 1000 terminates at 1010.

In one embodiment of process 1000, customer 14 may view the production line on monitoring terminal 14b and notice that the number of finished goods is too low. They may then fill out a form with the requirement of making 10,000 more finished goods in the next week. This requirement may be provided to contractor 12 the next time they access system provider 18, they may be provided a notification of a requirement (such as via an SMS message, automated voice message or an alert such as a pop-up message on a terminal at contractor 12 such as warehouse terminal 106 or production terminal 112), or the requirement may be emailed to them. Contractor 12 can then adjust the production line, for example using production module 120, to make sure the requirement is met.

In a further embodiment of process 1000, contractor 12 may view the production line on monitoring terminal 14*b* and notice that labor costs are too high and employees are not being productive or not meeting their target efficiencies. They then may remove two employees from the production line and replace them with one more skilled employee.

In yet a further embodiment of process 1000, contractor 12 may access production module 120 and receive a request for adjustment from customer 14 to increase production by 1000 finished goods per day. They may then select the production line and view the data. If they agree with the request they may select to adjust the production line. At 1018 they make the necessary adjustment (optionally using process 700 to ensure that the new requirements are met) and process 1000 terminates at 1010.

Exemplary User Screens that May Implement Aspects of the Invention

FIGS. 11A-D are user screens 1102 for creating a RFPR and may be used to varying extents in implementing process 500.

It is to be understood with any user screens 1102 in FIGS. 11-13, that user screen 1102 may be viewed on any terminal of customer 14 or contractor 12, may be provided by any module in system provider 18 such as customer module 22*c* and assembler module 22*a*, may display data from data stores 24 and may allow users to specify information (such as via user interface data elements (UIDE) 1104 which may be text boxes, list boxes, tables, auto-complete boxes, dropdowns, radio buttons, checkboxes, or other Asynchronous JAvascript and XML (AJAX) controls) and initiate processes and functionality as described herein (such as via user interface buttons (UIB) 1106). A user may navigate between user screens 1102, for example, via user interface buttons 1106 or other user interface buttons that may be known to those of skill in the art.

Figure 11A:
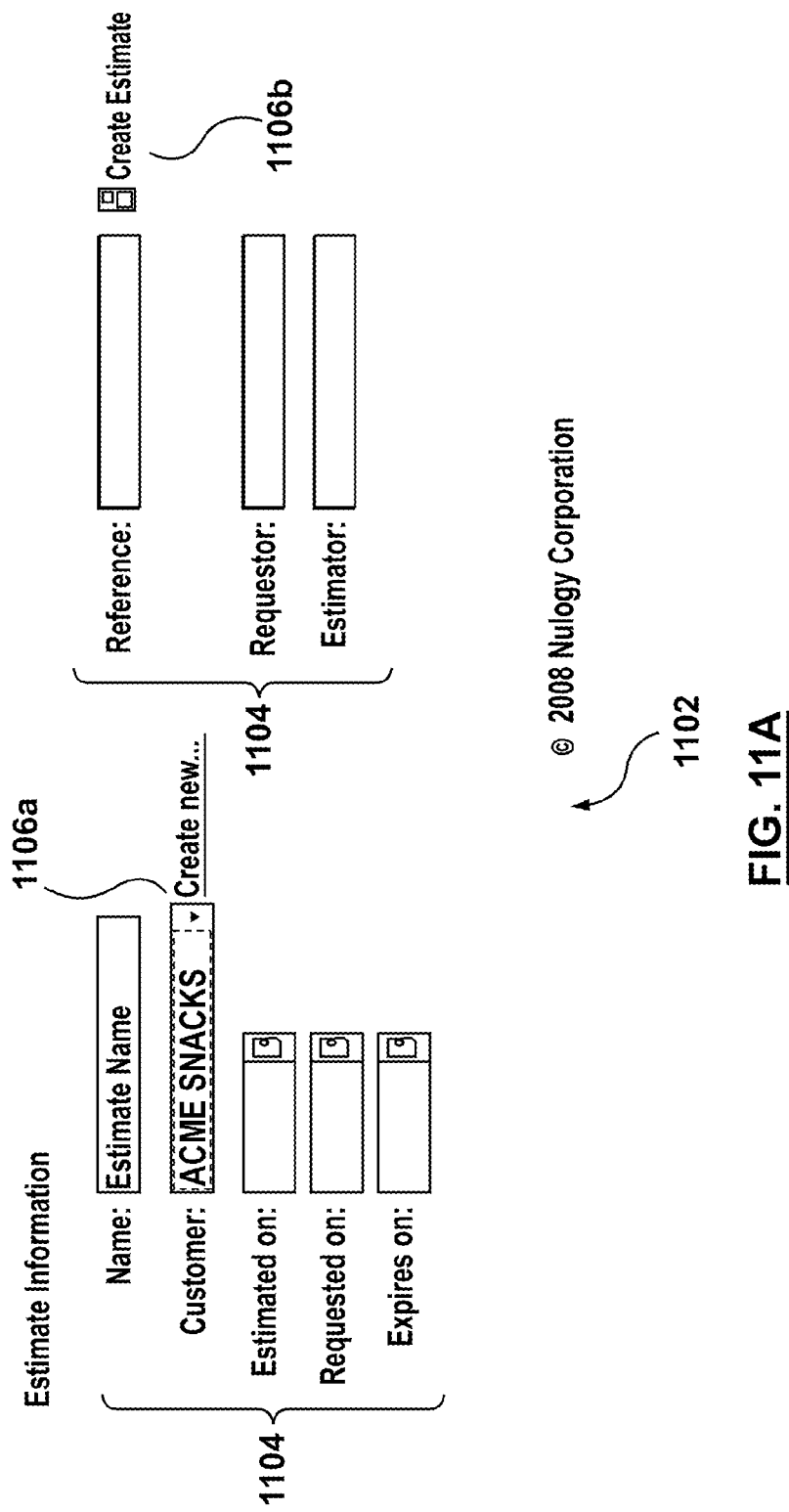

User screen 1102 in FIG. 11A may comprise one or more user interface data elements 1104 for general information about the RFPR and one or more UIB 1106. UIB 1106*b* may initiate 504 in process 500, for example. UIB 1106*a* may allow for creation of a new customer 14. This may be required if contractor 12 is creating a RFPR for a new customer 14.

User screen 1102 in FIG. 11B may comprise one or more user interface data elements (UIDE) 1104 for details about a scenario (such as item identifiers, volumes, and production time and pricing information), one or more UIB 1106 and pricing schedule table 1108.

UIB 1106*c* may add a scenario to an RFPR, such as if customer 14 requires a RFPR having a scenario for production of 10,000 finished goods and a scenario for production of 100,000 finished goods. UIB 1106*g* may initiate selecting a model or template for the scenario or RFPR, as described at 510 in process 500, copying a scenario of RFPR, or deleting a scenario or RFPR. may initiate 504 in process 500, for example. UIB 1106*f* may allow editing a RFPR or scenario, which may be accomplished using one or more UIDE 1104 and may be similar to 512 and 514 of process 500.

Pricing schedule table 1108 may show at least a portion of a pricing schedule that may relate to the scenario in FIG. 11B. The pricing schedule, or at least a portion thereof, may be viewed by selecting UIB 1106*d* and edited by selecting UIB 1106*e*. Selecting either UIB 1106*d* or 1106*e* may cause new user screens to be presented (not shown). As can be seen in FIG. 11B, pricing schedule table 1108 may include pricing information about labor, materials, overhead, setup and machines. Other information may be included as well.

Pricing schedule table 1108 may relate to one or more scenarios of a RFPR and/or one or more jobs of a project. Different scenarios, RFPRs, jobs and projects may have their own pricing table that may be reflected in different pricing schedule tables 1108. This may be particularly useful in determining, for example, a RFPR to accept (a decision that may be made by customer 14), a job to run during production, or a project that can proceed because one or more jobs provide adequate pricing results.

User screen 1102 in FIG. 11C may comprise one or more user interface data elements 1104 for information about production, one or more UIB 1106, pricing schedule wage details 1108*b*, and assembly steps table 1110.

Assembly steps table 1110 may be used to detail each step in the assembly of a particular finished good. Steps may be entered into assembly steps table 1110 manually or automatically if an old RFPR or scenario is used. Steps may include anything that must occur to produce finished goods and may include steps performed by machines, humans or a combination thereof.

UIB 1106*h* may be used to optimize the steps in assembly steps table 1110. Exemplary optimizations may include the following constraint/resultant optimization output pairings:

Constraint: a set number of people are available. Output: maximum throughput that can be achieved across all steps by distributing people.

Constraint: a set rate of production is desired. Output: required number of people at each step.

Constraint: a set number of people and rate of production. Output: required time for a person to complete each step.

Pricing schedule wage details 1108*b* may be part of pricing schedule 1108 and may allow tracking of any information relating to wages and employees including employees' time in production, their costs, effectiveness, speed, and waste.

UIB 1106*i* may allow edits to a scenario or RFPR to be saved to data stores 24.

User screen 1102 in FIG. 11D may comprise pricing schedule materials details 1108*c* and UIB 1106*i*. Pricing schedule materials details 1108*c* may be part of pricing schedule 1108 and may allow tracking of any information relating to materials including materials' codes, costs, markups, quantities needed and ordered and a unit of measurement.

User screen 1102 in FIG. 11E may comprise one or more UIDE 1104 for data about a finished good or sub-component and pricing schedule materials details 1108*c*. UIDE 1104 may present all required information about finished goods or sub-components for a scenario, RFPR, project, production line or job. If a template, model or previously used RFPR, scenario, production line or job was used to create the RFPR or project, many of UIDE 1104 may already be populated. A user may also populate any of UIDE 1104. Pricing schedule materials details 1108*c* may be part of pricing schedule 1108 and may allow tracking of any information relating to materials including materials' codes, costs, markups, quantities needed and ordered and a unit of measurement.

FIG. 12A-*are* user screens 1102 for a project, production line or job, and may be used to varying extents in implementing process 600. Where user screens 1102 in FIGS. 11A-E may relate to bidding on an RFP, user screens 1102 in FIG. 12A- may relate to implementing the production required by the RFP.

User screen 1102 in FIG. 12A may comprise one or more user interface data elements 1104 for general information about the project and one or more jobs, and UIB 1106*j*.

Figure 12B:
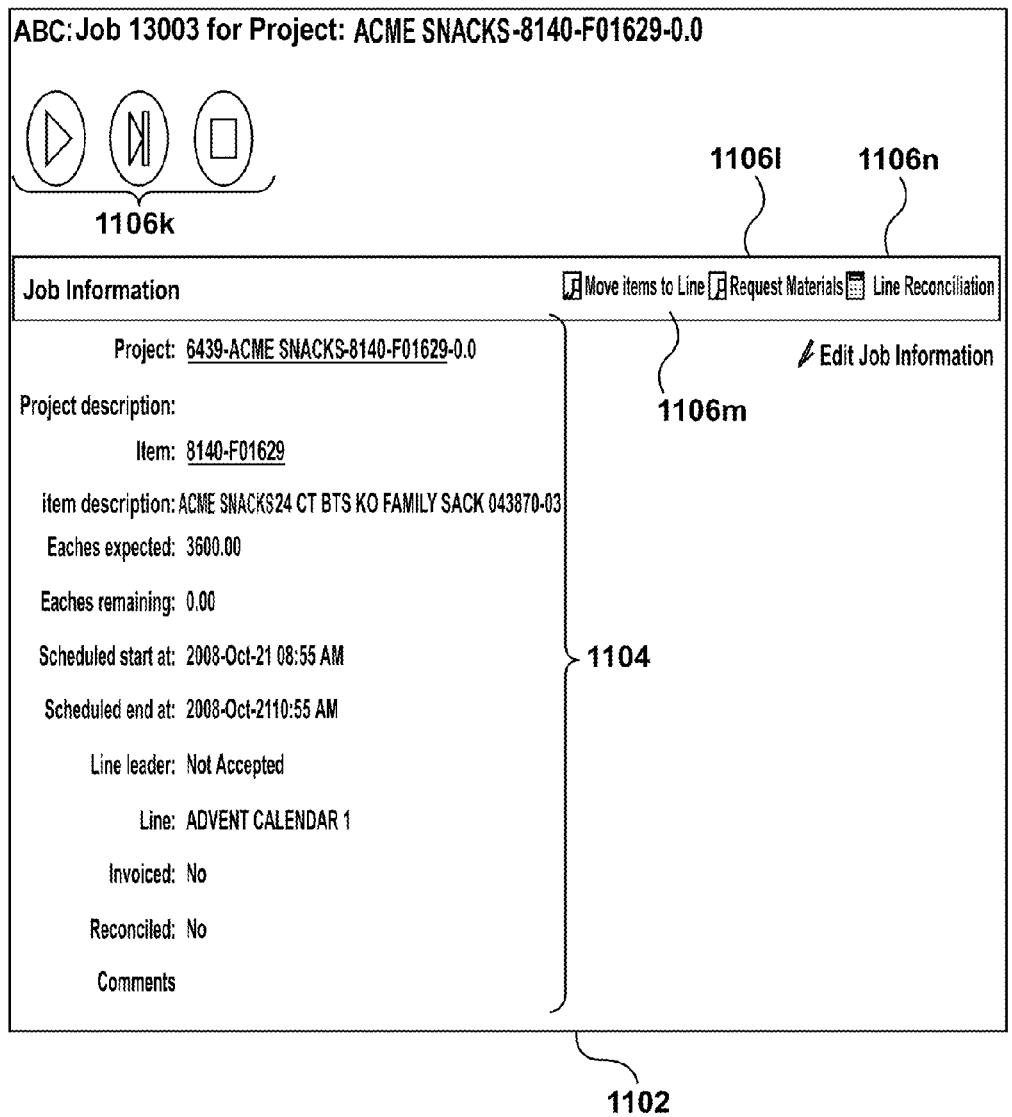
Figure 13:
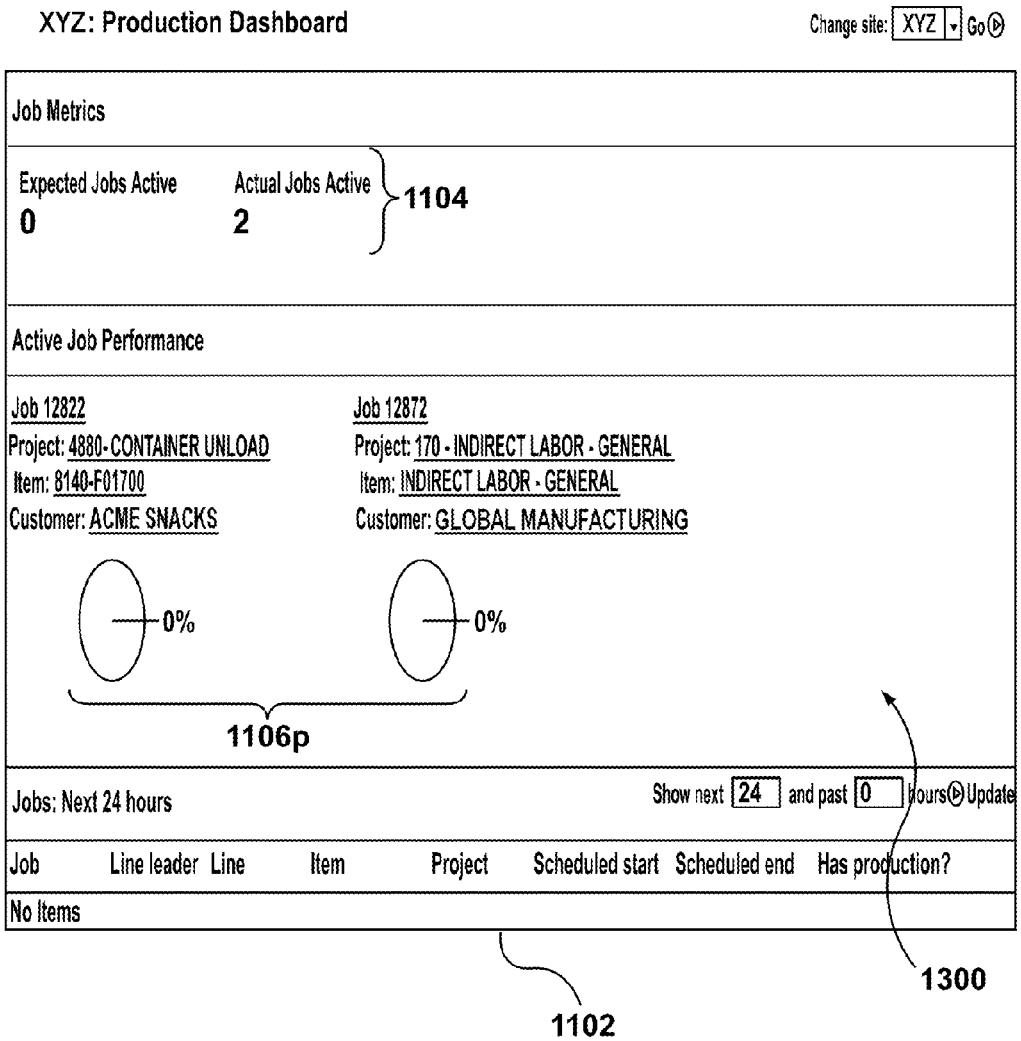
FIG. 13 is an embodiment of a user screen for a production dashboard according to the invention.

Selecting UIB 1106*j* may allow further information about a job or production line to be shown, such as user screens 1102 in FIGS. 12B.

User screen 1102 in FIG. 12B may comprise one or more user interface data elements 1104 for general information about the jobs, and one or more UIB 1106.

UIB 1106*k* may allow production to be started, stopped and paused. By way of example, job information on user screen 1102 in UIDE 1104 may only appear after a play button in UIB 1106*k* is selected. Similarly, a pause button is used when the job is paused, such as when a machine breaks or there is a break such as for lunch. Selecting the stop button may indicate a more permanent stop to the job, such as if requirements change, or sub-components have run out and there will be delay in receiving more. UIB 1106*k* may contribute to system provider's 18 ability to allow real-time tracking, monitoring and transaction data collection.

UIB 1106*l* may allow materials to be requested. Selecting UIB 1106*l* may provide a further user screen 1102 (not shown) where an order may be placed (such as by contractor 12) or where a request for an order to be placed may made (such as by customer 14). UIB 1106*l* may be used to varying extents in implementing process 700 and 1000 and in particular 712, 910, 1014 and 1018. Materials that can be requested may include sub-components, commodities, labor, and production line equipment 110.

UIB 1106*m* may allow items to be moved to the production line. This may be used, for example, to reflect moves for which transaction data was not captured or that have occurred but may not have been tracked.

UIB 1106*n* may allow a production line to be reconciled to its data. This may involve, for example, validating that any captured transaction data (such as via process 900 and using system 800) is accurate and making required updates. UIB 1106*n*, along with various other UIB 1106 on user screen 1102 in FIG. 12B may be used, possibly in conjunction with system 800 that captures transaction data, to ensure that the physical items (their location, amounts, reject amounts, number of finished goods etc) match the data stored in data stores 24 of system provider 18. This may at least part of the validation process.

Validation or reconciliation may include anything that ensures that the data representing the production conforms to the actual production. This may include, for example, manually counting finished goods, waste, inventory 908 and sub-components.

Other validation techniques, or techniques to prevent requiring validation may include:

- not allowing a pallet, case or unit to exist in two locations at the same time;
- providing a warning when the required amount of subcomponents to move are not physically available;
- suggesting, for movements to be made in system 10 or system 800, lot codes, expiry dates and Sku/pallet information of sub-components that physically exist in the warehouse, such as via an autocomplete function;
- requiring a user to enter lot codes and expiry dates when appropriate; ensuring start times are after end times and that people aren't clocking time simultaneously against multiple jobs or production lines;
- optionally ensuring that inventory (in a non-production area) cannot go negative;
- automatically associating lot codes and expiry dates in the production area with a job to make sure lot code and expiry date recall functionality will work even if the production is happening too fast for manual entry of the lot codes and expiry dates; and
- automating actions to reduce user error when performing common tasks such as returning unused production items to storage and moving required inventory to WIP.

Validation may be different for pallet-tracked and non pallet-tracked sub-components. For example, to reconcile pallet-tracked sub-component may require establishing what exact unit or piece of finished good the sub-components are part of. This may be required, for example, for sub-components that have expiry dates. Non pallet-tracking may make validation and reconciliation easier. Further, system 10, and production module 120 may dictate movements of sub-components and finished goods. Such dictation may lead moving the physical items and may keep data cleaner and facilitate validation.

An exemplary way to validate may begin with identification, or being provided with, items (for example sub-components or finished goods) that need reconciling. A manual count may then be obtained and compared with a count from system 10 (such that may be stored in data stores 24 and accessed, for example, by production module 120). The count from system 10 may include a breakdown of where the count came from (moves, production, rejects, consumption, other) that may be obtained, for example, through reference to the earlier captured transaction data by system 800. Data entry errors (such as transaction data that was missed, for example by human or machine error) can then be located and system 10, such as via production module 120, may suggest corrective actions. Once system 10 count agrees with the manual count, the item has been reconciled. It should be noted that in order to ensure that production lines may always enter data, system 10 may allow item counts (sub-component inventory counts for example) to go negative. Such negative values would then be reconciled at an appropriate time.

User screen 1102 in FIG. 12C may comprise one or more user interface data elements 1104 for information about labor, and one or more UIB 1106.

UIDE 1104 may receive information about the number of people working on a particular project, job or production line, for example working in various part of a warehouse, at WIP 816 or production line 818, or machine terminal 102. UIDE 1104 may receive information that may be scanned, such as employee badges that may be used to track hours worked, breaks taken and other relevant labor information such as wage rates. UIDE 1104 may also track expected labor information and actual labor information. One or more modules, such as production module 120, with UIDE 1104 may track production line labor costs that are typically lost, such as "non-value-added" or "off-line" time. This off-line time may occur when line operators physically move between production lines. Production module 120 can automatically associate the time between when a user leaves a first production line (which may be indicated, for example, by swiping their badge) and when the user enters into the second production line. This time may be attributed to either production line. This may allow managers to capture time and charge for production lines that require lots of such movement—usually resulting in a cost to contractor 12 (or that contractor 12 may try to recover only at an aggregate level).

UIDE 1104, in user screen 1102 in FIG. 12C (and in fact any other user screens 1102) may provide substantially real-time information or data. UIDE 1104 may further be updated in real-time as changes to the data occur, such as when transaction data is captured such as by system 800. Exemplary real-time data in UIDE 1104 may include the actual number of people working, actual person hours, and employee breaks information which may be captured through employees swiping passes or ID tags upon entering and exiting.

UIB 1106*o* may allow time records to be updated, optionally in real-time or historically. By way of example, if an incorrect value was entered, incorrect data may have been stored as the data may be captured real-time. UIB 1106*o* may then allow a correction to be made at a later time, allowing the captured transaction data to be updated with the corrected numbers. Although the ability to correct data errors after the fact may have many application, at least one application is to ensure that any decisions made based on the data are using accurate data.

User screen 1102 in FIG. 12D may comprise one or more UIDE 1104 for production information.

UIDE 1104 may include finished goods produced (which may be measured in pallets, cases, or 'eaches'), pallets, cases, or 'eaches' per hour, efficiency and other production information and may be substantially in real-time. UIDE 1104 may include lot codes and expiry dates for finished goods and sub-components. This information can be used for lot code recall or traceability and may be used to ensure that finished goods are shipped before they expire.

By way of example, expiry dates and lot codes may allow lot recalls, at substantially any level of granularity (at the job, pallet, case, or 'eaches' level) for sub-components and finished goods. This may be facilitated, for example, by transaction data having been captured that specifies what pallets, cases or 'eaches' of sub-components went into what specific finished goods. As such, when a sub-component pallet to recall is specified, captured transaction data can be used to determine which job produced the finished goods, which are the resultant specific finished goods, where they are in the warehouse and whether it required a manual adjustment due to inaccurate capturing of transaction data. These finished goods can then be recalled. Without capturing transaction data it may be impossible to determine which finished goods were as a result of the pallet of sub-components to be recalled. This may result in many finished goods being recalled needlessly.

This information may be entered manually by a user for example at contractor 12, via any one or more of machine terminal 102, warehouse terminal 106, RFP response terminal 108, production line equipment 110, and production terminal 112.

If contractor 12 has an inventory system such as system 800, UIDE 1104 may receive information from system 800 (directly or indirectly and automatically or via user interaction with one or more terminals in system 800) and may also convert subcomponents into finished goods without manually entering the information.

User screen 1102 in FIG. 12E may comprise one or more user interface data elements 1104 for information about rejects, scraps, quality checks and waste. This may include information about sub-components, finished goods and any materials used in making or assembling the sub-components or finished goods.

Quality checks may be performed manually such as by an operator, by one or more production line equipment 110, or a combination thereof. Data relating to the quality checks (such as pass/fail, a description of the nature of the fail, the location of the fail, the operator that was responsible and other data) may be captured as transaction data, for example by production line equipment 110, may be entered into WIP terminal 826/106 or any terminal in system 800.

FIG. 13 is a user screen 1102 for a production dashboard 1300. User screen 1102 in FIG. 13 may comprise one or more UIDE 1104 for information about production, and one or more UM 1106*p*. Production dashboard 1300 may be used to varying extents in implementing process 1000 and 700. Production dashboard 1300 may also update automatically without user intervention to display the most up-to-date information. This may occur, for example, by polling one or more data stores 24 on a periodic basis.

Production dashboard 1300 may allow monitoring of projects and production lines by contractors 12 and customers 14. Production dashboard 1300 may be viewed on computing devices at contractor 12, customer 14, system provider 18 or remote from any of these locations such as traveling employees or third parties such as suppliers and receivers of finished goods. Production dashboard 1300 may allow users to be alerted to conditions of any one or more aspects of production that may be displayed on production dashboard 1300. Such alerting or notification may be as alerting and notification are described herein and may include SMS messages, emails and alerts when a user is using system provider 18 and/or system 800. Production dashboard 1300 may further allow a user to communicate to the warehouse where production may be occurring, and in particular to one or more terminals in the warehouse. This may facilitate alerting or other tasks such as controlling computing devices (such as equipment and machines) in the warehouse.

UIDE 1104 may have at least a portion of the information contained in UIDE 1104 in FIGS. 12A-E and may have additional information. UIDE 1104 may be populated from information in data stores 24 and may users to enter data into them, which may then be stored in data stores 24.

UIB 1106*p* may allow one or more user screens (not shown) to be displayed that may provide more information about a particular job or project.

FIG. 14 is an embodiment of a user screen for capacity planning according to the invention. FIG. 14 comprises view adjuster 1404, capacity planning visual tool 1402, project selection links 1406 and production requirement selection 1408.

Capacity planning visual tool 1402 may show one or more jobs for one or more projects that are to occur. It may include multiple production lines and may show one or more resources that are needed, sub-components that are needed, requirements from a customer, finished goods available or required, or substantially any other information pertaining to an assembly or service. Capacity planning visual tool 1402 may allow a user to see what requirements may not be met (this may be indicated using, for example, highlighting of aspects of capacity planning visual tool 1402 that will fail or may cause a failure) and may allow a user to adjust a job (such as by pulling it to earlier in the day) to try and correct the failure that may occur. If the indicator reverts to showing "safe" (such as by removing the failure color) a user may know that the current plan will meet requirements. Capacity planning visual tool 1402 may also be connected with various other modules or systems, such as system 800, for real-time displays and capacity planning. It is to be understood that many aspects of capacity planning, and production monitoring, may be performed using capacity planning visual tool 1402.

View adjuster 1404 which may allow altering aspects of the view on the screen such as adjusting the number of hours or days visible, and what areas or sections of the overall process to include in the view (such as aspects of WIP 818 or the warehouse). Changes in view adjuster 1404 may cause different information to be displayed in capacity planning visual tool 1402, for a given project.

Project selection links 1406 may simply allow a user to view capacity planning information, for the selected project, in capacity planning visual tool 1402.

Production requirement selection 1408 may allow a user to see, for example in capacity planning visual tool 1402, information about a particular item, project, job or finished good, for a given time period.

It will be apparent to one of skill in the art that other configurations of modules and hardware may be used in any of the foregoing embodiments of the products, methods, and systems of this invention.

It will be understood that the specification is illustrative of the present invention and that other embodiments within the spirit and scope of the invention will suggest themselves to those skilled in the art.

All references cited herein are incorporated by reference.

What is claimed is:

1. A system, comprising:
   an inventory management server connected to a network and having a data store;
   a receiving terminal located at a facility for fabricating a finished good from a plurality of components; the receiving terminal configured, in response to a first quantity of one of the components arriving at the facility, to capture first transaction data describing the arrival of the first quantity, and to send the first transaction data to the inventory management server via network;
   a warehouse terminal located at the facility and configured, in response to a second quantity, being a portion of the first quantity, of the one component being moved to a production line in the facility, to capture second transaction data describing the movement of the second quantity of the one component, and to send the second transaction data to the inventory management server via the network;
   a production terminal located at the facility and configured, in response to a third quantity, being a portion of the second quantity, of the one component being converted into a fourth quantity of the finished good at the production line, to capture third transaction data describing the conversion of the third quantity of the one component, and to send the third transaction data to the inventory management server via the network;
   a shipping terminal located at the facility and configured, in response to the fourth quantity of the finished good being shipped from the facility, to capture fourth transaction data describing the shipping of the fourth quantity of the finished good, and to send the fourth transaction data to the inventory management server via the network;
   the inventory management server configured to store each of the first, second, third and fourth transaction data in corresponding transaction records in the data store; and to respond to a request to view transaction data by selecting at least one of the transaction records and transmitting the selected transaction records for the display.

2. The system of claim 1 wherein the request to view transaction data is received at the inventory management server from one of the receiving terminal, the warehouse terminal, the production terminal and the shipping terminal.

3. The system of claim 1 wherein the third transaction data includes labor data identifying an employee performing the conversion.

4. A method in a facility for fabricating a finished good from a plurality of components, comprising:
   in response to a first quantity of one of the components arriving at the facility, capturing, using a receiving terminal located at the facility, first transaction data describing the arrival of the first quantity of the one component;
   in response to a second quantity, being a portion of the first quantity, of the one component being moved to a production line in the facility, capturing, using a warehouse terminal located at the facility, second transaction data describing the movement of the second quantity of the component;
   in response to a third quantity, being a portion of the second quantity, of the one component being converted into a fourth quantity of the finished good at the production line, capturing, using a production terminal located at the facility, third transaction data describing the conversion of the third quantity of the one component;
   in response to the fourth quantity of the finished good being shipped from the facility, capturing, using a shipping terminal, fourth transaction data describing the shipping of the fourth quantity of the finished good;
   sending the first transaction data, the second transaction data, the third transaction data and the fourth transaction data to an inventory management server via a network;
   at the inventory management server, receiving and storing the first, second, third and fourth transaction data in corresponding transaction records in a data store;
   responding to a request to view transaction data by selecting at least one of the transaction records and transmitting the selected transaction records from the inventory management server for display.

5. The system of claim 1 wherein the inventory management server is configured to operate as a Software as a Service (SaaS).

6. The system of claim 1 wherein the inventory management server is configured to receive one or more warehouse inputs from one or more warehouse systems.

7. The system of claim 6 wherein the first, second, third and fourth transaction data are captured as at least one of user inputs and machine inputs.

8. The system of claim 1 wherein the first, second, third and fourth transaction data are sent to the inventory management server substantially in real-time with the arrival, movement, conversion and shipping, respectively.

9. The system of claim 1 wherein the inventory management server is further configured to enable making changes, or requesting changes, to one or more production lines.

10. The system of claim 1 wherein the inventory management server is configured to receive one or more assembler inputs and create one or more production lines.

11. The system of claim 10 wherein the inventory management module server is configured to receive one or more requirements and one or more resource inputs to create one or more scenarios for the one or more production lines.

12. The system of claim 11 wherein the inventory management module server is configured to determine whether, for at least one of the one or more scenarios, at least one of the one or more requirements for the production line can be met based on at least one of the one or more resource inputs.

13. The system of claim 12 wherein the determining occurs in real-time.

14. The system of claim 13 wherein the inventory management server is configured to allow monitoring of the production line and making changes, or requesting changes, thereto.

15. The system of claim 1 wherein the inventory management server further comprises a request for proposal response (RFPR) module for creating a RFPR.

16. The system of claim 15 wherein the RFPR module receives assembler inputs to create the RFPR.

17. The system of claim 16 wherein the inventory management server is configured to receive one or more assembler inputs and converts the RFPR into a production line.

* * * * *